Oct. 3, 1944.  W. B. EDDISON  2,359,470
UNBALANCE CORRECTION MACHINE
Filed Aug. 3, 1940  12 Sheets-Sheet 1

INVENTOR
WILLIAM BARTON EDDISON
BY
Fred G. Parsons
ATTORNEY

Oct. 3, 1944.   W. B. EDDISON   2,359,470
UNBALANCE CORRECTION MACHINE
Filed Aug. 3, 1940   12 Sheets-Sheet 2

INVENTOR
WILLIAM BARTON EDDISON
BY
Fred A. Parsons
ATTORNEY

Oct. 3, 1944.　　　　W. B. EDDISON　　　　2,359,470
UNBALANCE CORRECTION MACHINE
Filed Aug. 3, 1940　　　12 Sheets-Sheet 3

INVENTOR
WILLIAM BARTON EDDISON
BY
Fred G. Parson
ATTORNEY

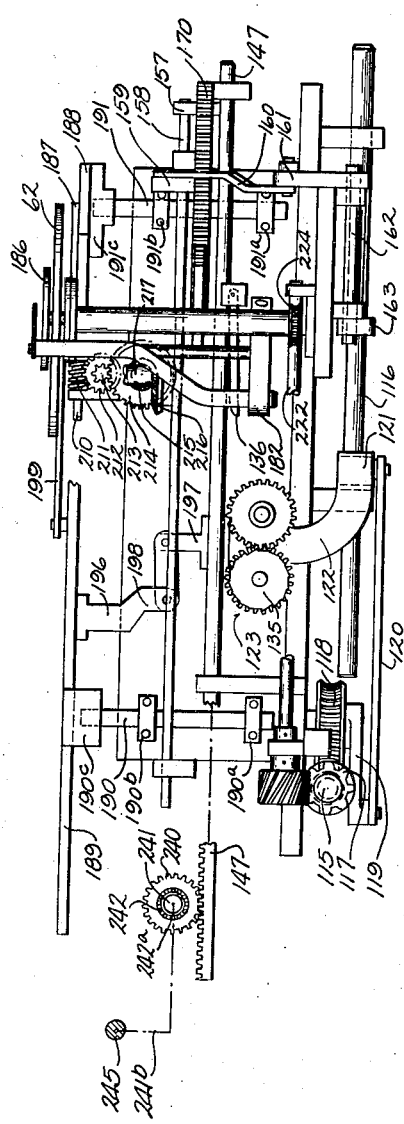

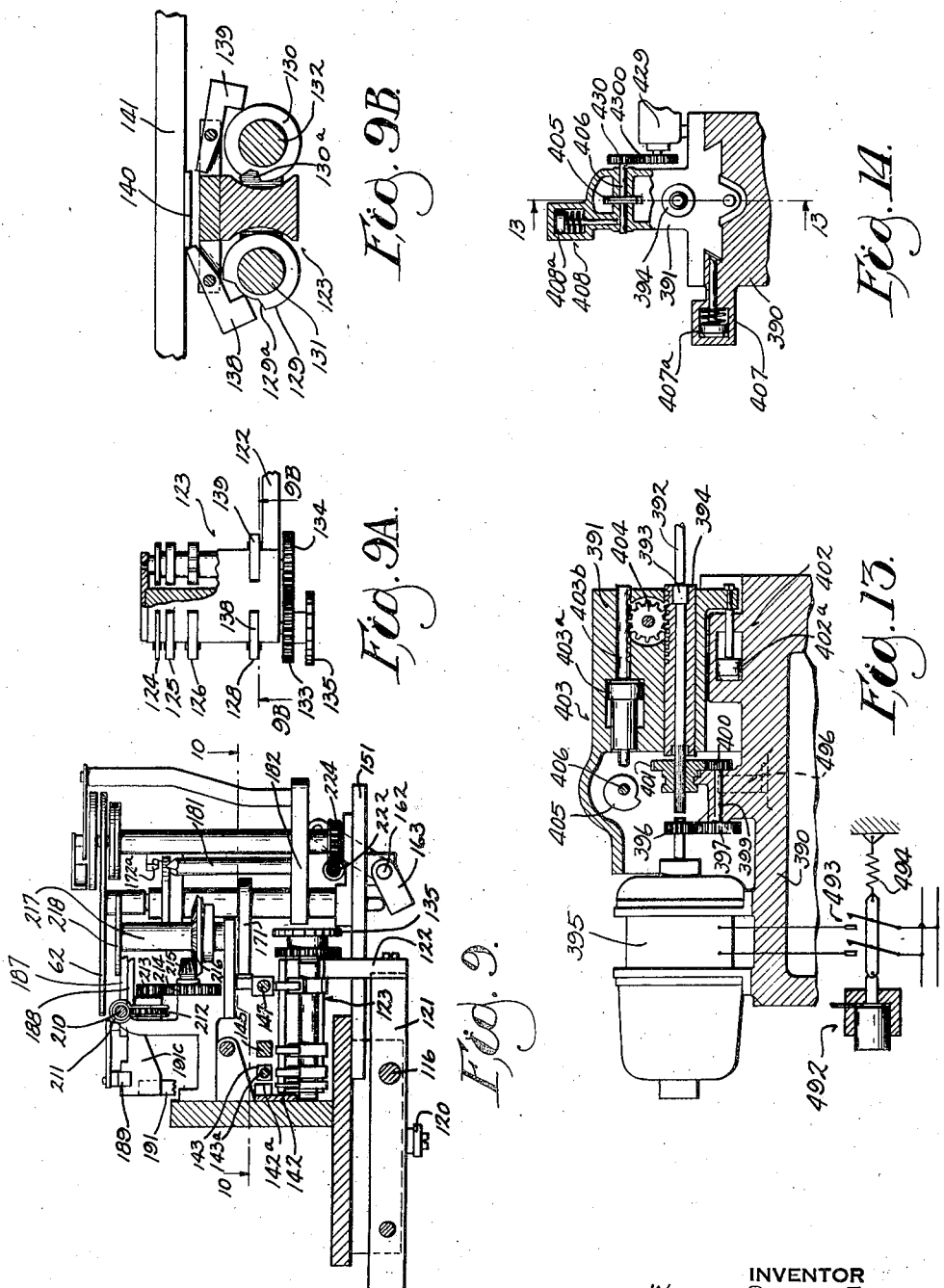

Oct. 3, 1944.                 W. B. EDDISON                 2,359,470
                        UNBALANCE CORRECTION MACHINE
                        Filed Aug. 3, 1940        12 Sheets-Sheet 6
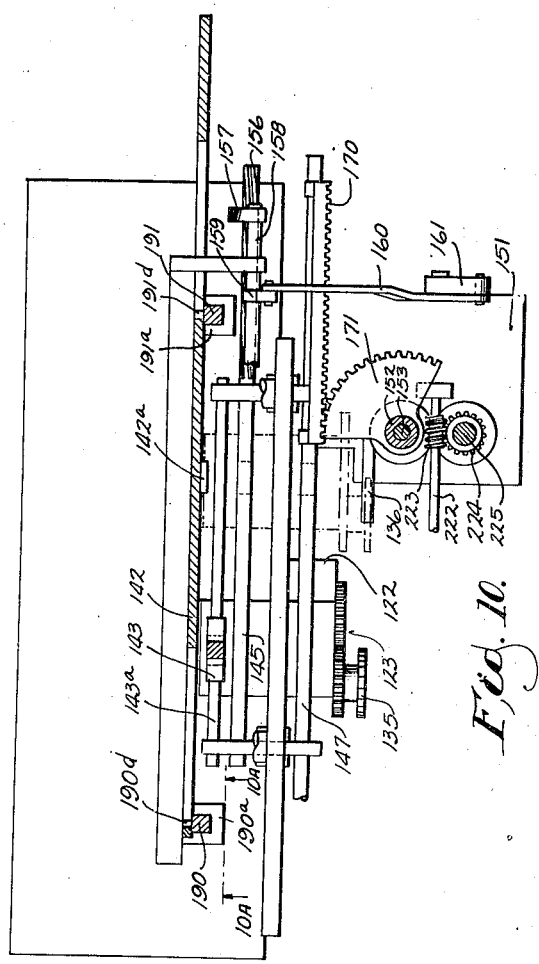
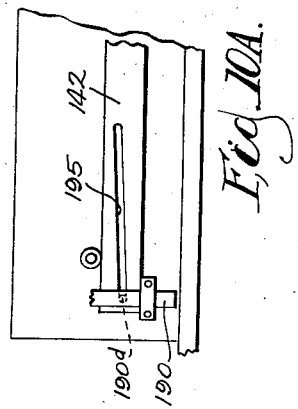
INVENTOR
WILLIAM BARTON EDDISON
BY
Fred G. Parsons
ATTORNEY

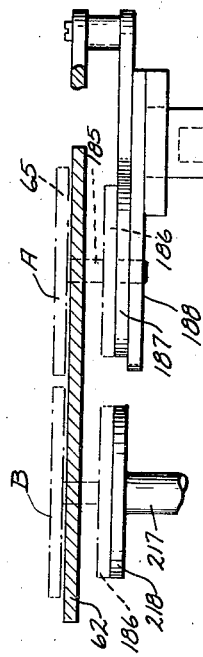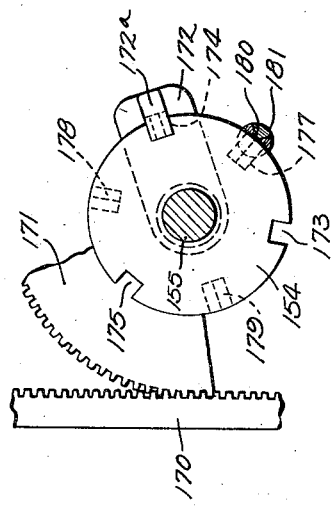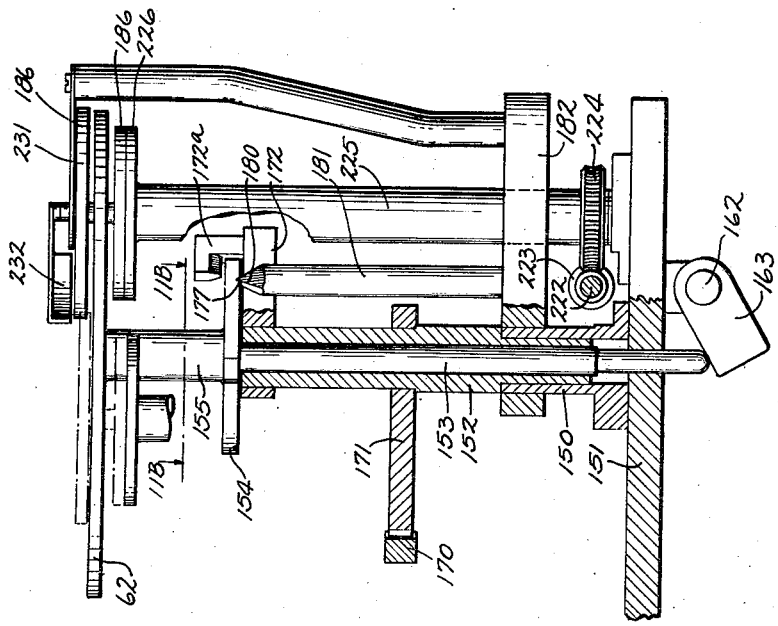

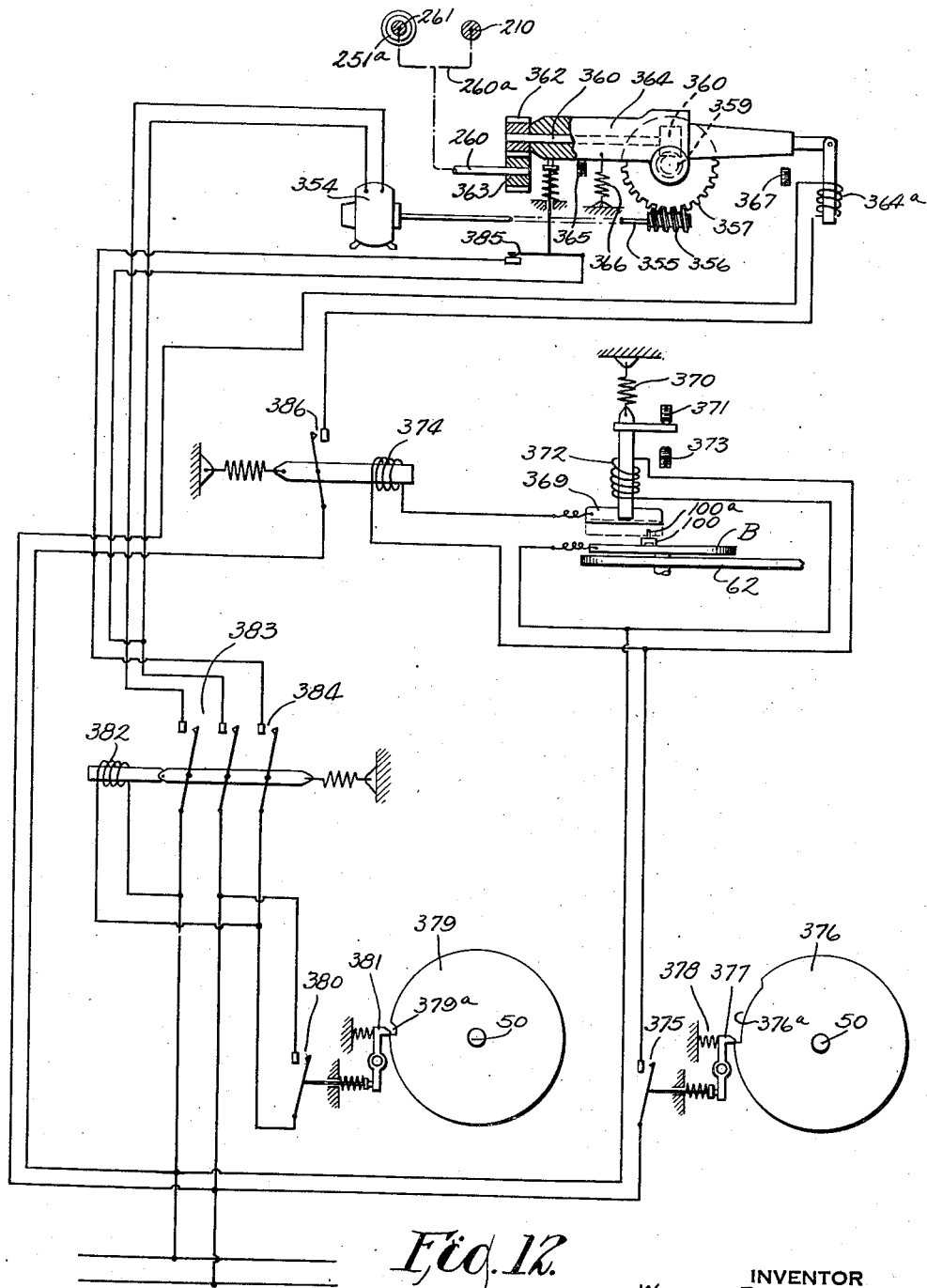

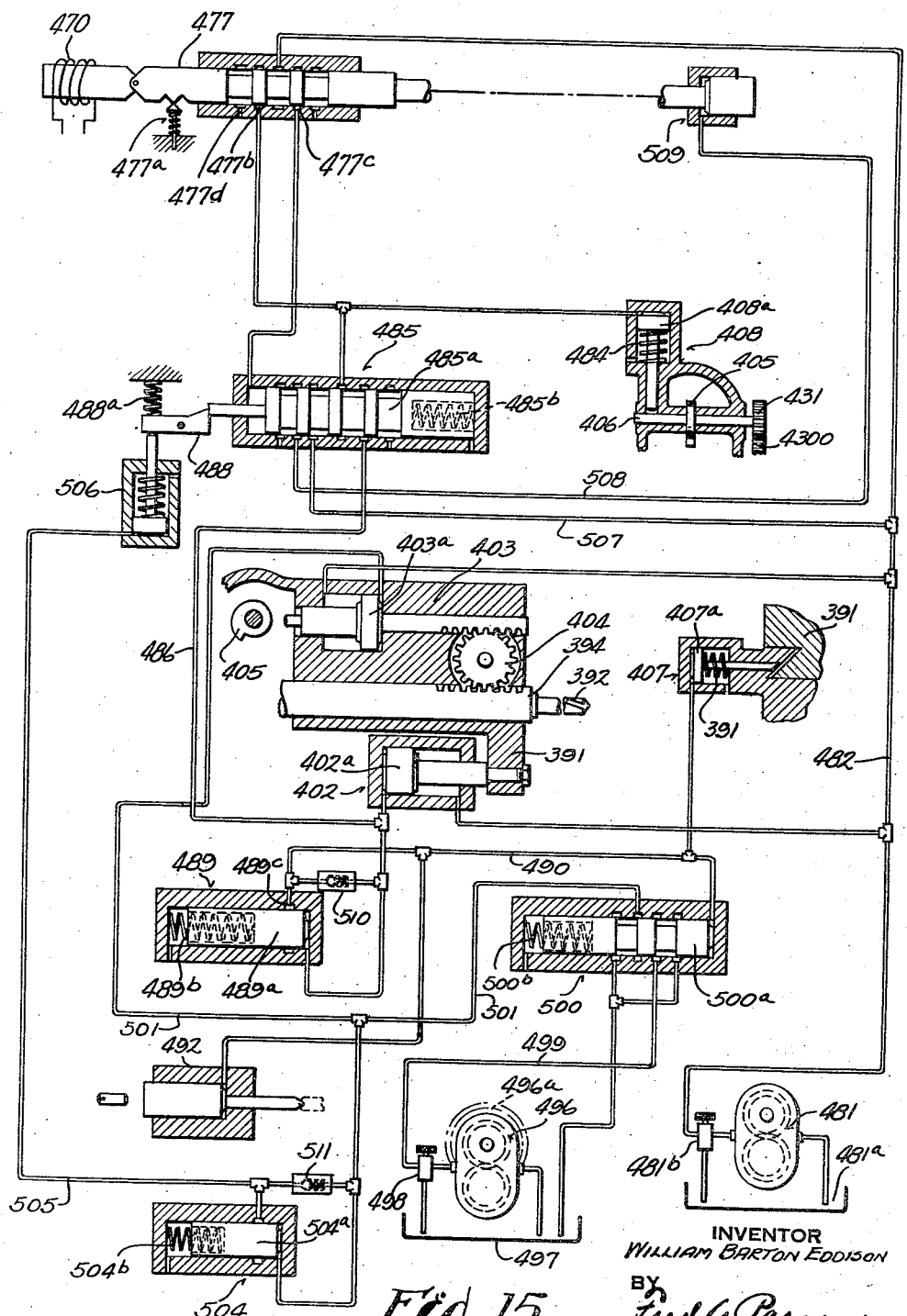

Oct. 3, 1944.  W. B. EDDISON  2,359,470
UNBALANCE CORRECTION MACHINE
Filed Aug. 3, 1940   12 Sheets-Sheet 10

INVENTOR
WILLIAM BARTON EDDISON
BY
Fred G. Parsons
ATTORNEY

Oct. 3, 1944.    W. B. EDDISON    2,359,470
UNBALANCE CORRECTION MACHINE
Filed Aug. 3, 1940    12 Sheets-Sheet 11

INVENTOR
WILLIAM BARTON EDDISON
BY
Fred C. Parsons
ATTORNEY

Patented Oct. 3, 1944

2,359,470

UNITED STATES PATENT OFFICE 2,359,470

UNBALANCE CORRECTION MACHINE

William Barton Eddison, Irvington, N. Y.

Application August 3, 1940, Serial No. 350,974

31 Claims. (Cl. 77—5)

This invention relates to correction of unbalance in work pieces, particularly for such correction about an intended axis of rotation, and especially for parts such, for example, as engine flywheels.

The invention is a continuation in part of the copending application Serial No. 280,907, filed June 24, 1939, now Patent No. 2,300,354, dated October 27, 1942, and in part an improvement and modification of the balancing methods and structure shown in that application.

A purpose of the invention is to provide an improved method of balancing, or for some of the operations for effecting a balanced work piece.

A further purpose is to provide improved balancing means including units for carrying out individual steps of a balancing operation, or a machine for carrying out a series of such steps, and particularly such units or machines in a form adapted for automatic or semi-automatic operation.

A further purpose is to generally simplify and improve the method of balancing unbalanced work pieces, and the construction, operation and relationship of parts of machines for balancing.

Still other objects will be apparent from this specification of the invention, it being understood that the invention includes the methods and structures illustrated, described and claimed and such other methods or structures as are equivalent to the claims.

The same reference characters have been used for the same parts throughout, and in the drawings:

Figure 7 is a semi-diagrammatic rear elevation of some of the mechanism of the machine of Fig. 4, including certain actuating and timing mechanism for the control pattern device of Fig. 5.

Figure 8 is a semi-diagrammatic top view of the structure of Fig. 7.

Figure 9 is a vertical section taken approximately at line 9—9 of Fig. 8.

Figure 9A is an enlarged partial top view of a timing and actuator unit shown in Fig. 9.

Figure 9B is a vertical section taken at line 9B—9B of Fig. 9A.

Figure 10 is a partial horizontal section taken approximately at line 10—10 of Fig. 9.

Figure 10A shows a portion of the mechanism of Fig. 10, viewed from line 10A of Fig. 10.

Figure 11 is an enlarged partial vertical section of some of the structure of Figs. 7, 8, 9, 10, taken approximately at line 11—11 of Fig. 8.

Figure 11A is an enlarged partial vertical section taken approximately at 11A—11A of Fig. 8.

Figure 11B shows some of the structure of Fig. 11 as viewed from line 11B—11B.

Figure 12 is a semi-diagrammatic drawing showing parts and their operating relationship as used in the machine of Fig. 4 for positioning of the unbalance of a work piece in a preferred angular relationship.

Figures 13, 14 are respectively side and bottom views, each partly in section, of a driller unit shown in Fig. 4, the views each being enlarged.

Figure 15 is a diagram showing parts and their operating relationship of certain controlling and actuating mechanism for the driller unit of Figs. 13, 14.

Figure 1:
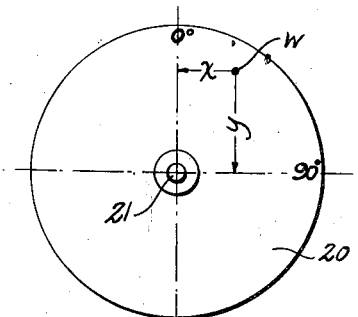
Figure 1 is a top view of a flywheel shown in Fig. 2.

There will first be described some of the unbalance measuring principles used in the machine herein shown.

In the diagrams, Figs. 1, 1A, 2, 3, 3A a work piece 20 is carried on a support 22 with the intended axis of work rotation 21 vertical, the support being balanced about a horizontal axis such as 23. The work piece is located on support 22 for the intended rotation axis to intersect the pivot axis 23, and if the work piece is perfectly balanced the work axis is retained in vertical position, Fig. 2, by a spring 24, there being adjusting nuts 24a to adjust the spring then to have zero load. A pointer 25 reads against a scale 26 to indicate the turning moment set up by an unbalance in either direction from the zero position.

If an unbalance exists in the work piece it may be considered for correction purposes as a weight $w$ acting at a point which, for the present, may be assumed to be as shown in Fig. 1, within the 0°–90° quadrant of the work piece carried on support 22, at undetermined distances $x$ and $y$ respectively from the 0° and 90° radii of the axis 21. Unbalance so located will cause a moment of rotation about pivot 23 which is equal to $wx$ and is weighed by the spring 24 to indicate its value on scale 26, the pointer movements being proportional to such value.

Figure 1A:
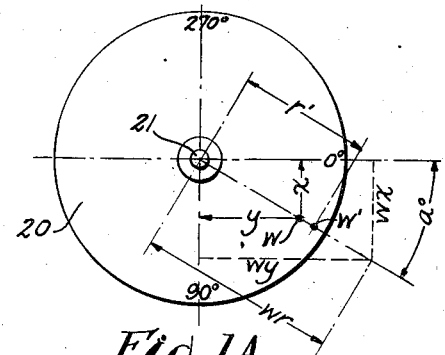
Figure 1A is a similar view of the flywheel, rotated 90°.
Figure 2:
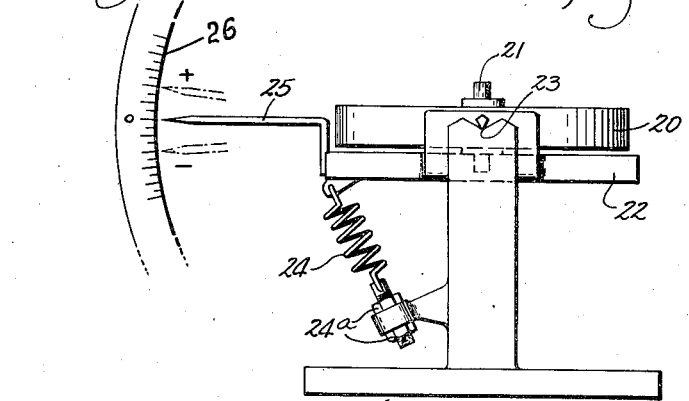
Figure 2 is a diagram illustrating a device for measuring unbalance in a flywheel with the intended axis of rotation vertical.

If the work piece 20, Fig. 2, is then turned to the position shown in Fig. 1A, the unbalance $w$ will now set up a turning moment about pivot 23 having a value $wy$, which will be similarly indicated on scale 26, and a parallelogram of the known forces $wy$, $wx$, Fig. 1A, determined by the pointer readings, establishes $a°$ as the angular position of the unbalance relative to the 0° radius of the work piece. The value of $wr$ in the force parallelogram is also established, and if work piece material is removed at a point $w'$ at any radial distance $r'$ along the radial line now located for the unbalance $w$, such material removal will balance the work piece when the weight of the removed material satisfies the equation $w'r'=wr$. The selection of any convenient radius value for $r'$ establishes the weight of material $w'$ required to be removed for effecting balancing; or the equivalent material can be added if preferred along the extended 0° radius at the other side of the axis 21.

The initial position of the unbalance $w$ in the moment measuring device of Fig. 2 may be at any angle, but whatever the angle the position and amount of correction required may be determined in the manner described. Thus, for example, in Figs. 3, 3A the work piece is assumed to be initially positioned with its unbalance in the 180°–270° quadrant, whereby the correction angle, Fig. 3A, is $180°+a°$ from the zero point on the work piece.

Figure 3:
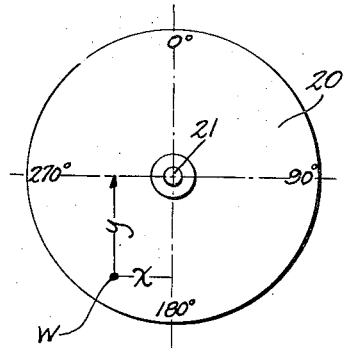
Figures 3, 3A are views respectively corresponding to Figs. 1, 1A but showing an unbalance located in a different angular relationship.
Figure 3A:
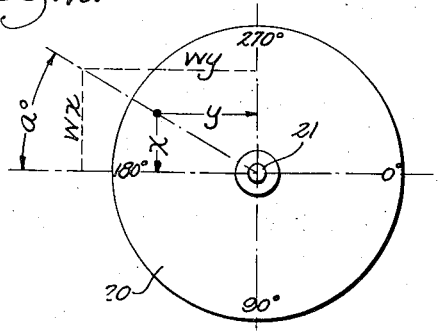

It will be noted that during the measuring of the moments $wx$ and $wy$, Figs. 1, 1A, the pointer 25 moves upwardly, Fig. 2, from the zero mark on scale 26, while during the measurement of $wx$ and $wy$, Figs. 3, 3A, the pointer moves downwardly. The relative direction of the first and second pointer movements obtained in measurements such as described is determinative of the angle of the unbalance relative to the zero degree point on the work piece. Thus, where the upward movement of the pointer 25 is considered as positive (+) and the downward movement as negative (−), it will be apparent that, if both the measurements are positive the unbalance is $a°$ from the zero degree point on the work piece, as in Figs. 1, 1A. If the first measurement is positive and the second is negative the angle is $90°+a°$ from work piece zero. If both measurements are negative the angle is $180°+a°$ from work piece zero, as in Figs. 3, 3A. If the first measurement is negative and the second is positive the angle is $270°+a°$ from work piece zero.

From the foregoing it will be apparent that, where measurement of unbalance is effected in two 90° positions of a work piece in the manner described, the amount and direction of the two movements of a measuring pointer such as pointer 25, Fig. 2, completely determine the unbalance, both as to position and amount, so far as is necessary for correction thereof.

Figure 4:
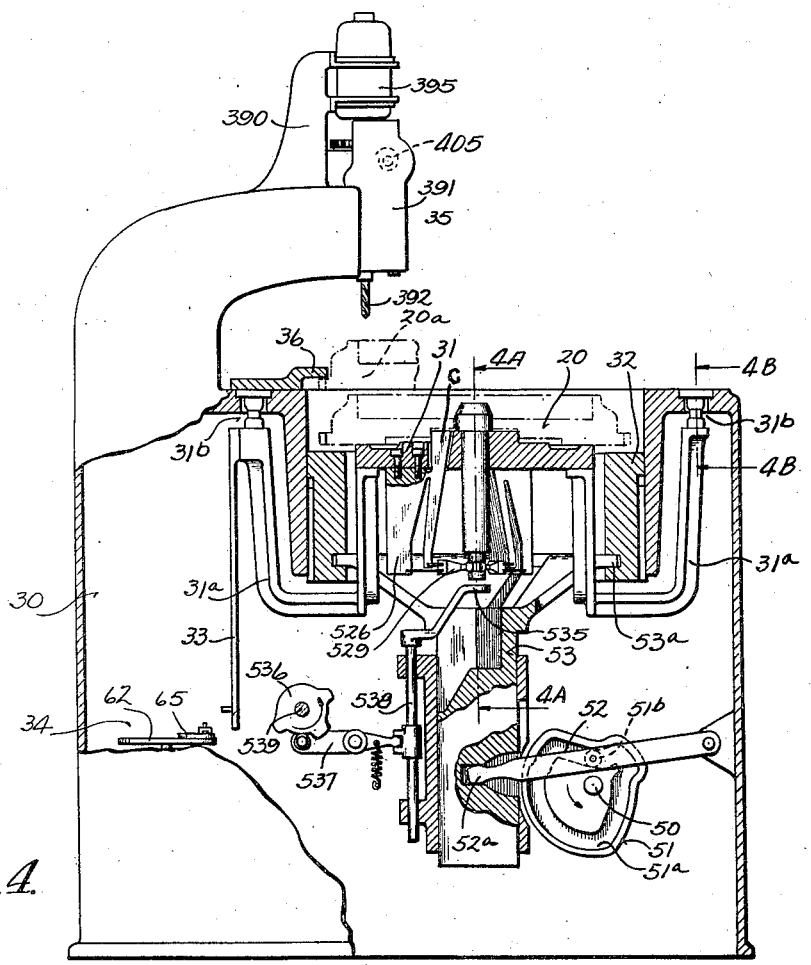
Figure 4 is a semi-diagrammatic side elevation, mostly in section taken along line 4—4 of Fig. 4A, of a balancing machine utilizing the methods of unbalance measurement illustrated in the device of Fig. 2. Some of the mechanism of the machine is omitted in Fig. 4, for clearness.
Figures 4A, 4B:
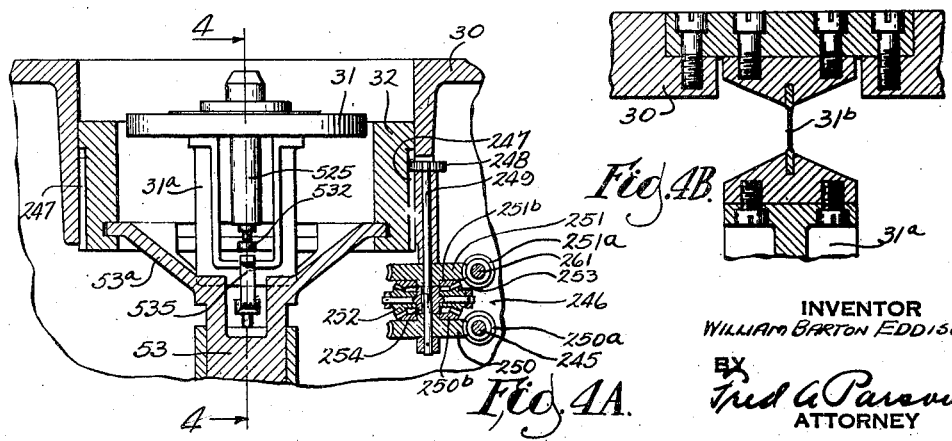
Figure 4A is a semi-diagrammatic partial vertical section taken approximately along line 4A, 4A of the machine of Fig. 4.
Figure 4B is an enlarged partial vertical section taken along line 4B, 4B of the machine of Fig. 4, illustrating weighing springs used in the machine.

As will appear, the machine of Fig. 4 utilizes the method explained in connection with Figs. 1, 2, 3, for determining the angular position and amount of unbalance in work pieces, and provides correction mechanism controlled in accordance with the response of the determining mechanism to effect balancing of the work pieces. A brief description of the machine and its operation is as follows:

Referring to Figs. 4, 4A, the machine includes a housing or frame 30 pivotally supporting a weighing table 31, the table being fixed with brackets on arms such as 31a, 31a, which are connected to the frame 30 by pivot spring members such as 31b, 31b, Figs. 4, 4B. An annular work carrier 32 is both rotatable and vertically movable. At the start of a cycle of machine operation for the balancing of a work piece the carrier 32 is in an upper position, whereby to receive a work piece 20 at a loading level indicated at 20a. The carrier is then lowered to the position shown, whereby to deposit the work piece on the weighing table 31, with which it is then centered and clamped by the means of clamp mechanism generally denoted as C. An arm or pointer 33, fixed for movement with weighing table 31, then moves in accordance with the amount and angular position of any unbalance present in the work piece in the manner explained for the first movement of the pointer 25 of Fig. 2. This first movement of the pointer 33 is utilized at this time to effect a corresponding first adjustment of a control pattern device generally denoted by the numeral 34.

Following the first measuring and recording of unbalance, as stated, the work piece is unclamped from the weighing table 31, and carrier 32 is raised sufficiently to lift the work piece from the weighing table. In this position the work piece and carrier are rotated 90° to effect the angular position, as explained for Fig. 2, for the second weighing operation. The work carrier 32 is then again lowered to the position shown in Fig. 4, the work piece is again clamped to the weighing table 31 and the second weighing operation is performed, with the resulting movement of pointer 33 recorded on the pattern device 34, as before. This completes an adjustment of the pattern device 34 in accordance with the angular position and amount of the unbalance in the work piece.

The work piece is now unclamped and the carrier 32 raised for the work piece to be free from the weighing table, and the carrier and work piece are then rotated under the control of the pattern device 34 to angularly position the unbalance in predetermined position relative to an unbalance correction device generally denoted as 35, Fig. 4, which in this instance includes a drilling unit as later explained. With the work piece in such predetermined angular position the carrier 32 is raised further, somewhat above the initial position 20a of the work piece, whereby to clamp the work piece between the carrier and clamp members such as 36 during the correction operation.

At about this same time certain adjustable portions of the correction device 35 are adjusted in accordance with the previous adjustment of the pattern device 34, whereby to determine the amount of unbalance correction to be effected by the correction device, and following the work clamping and stop adjustment mentioned the cycle of operation of the correction device 35 is initiated. Following completion of the correction cycle of the device 35, the carrier 32 is lowered to effect the initial work piece position indicated at 20a, and the balanced work piece may then be removed from the machine.

It will be understood that in the machine herein shown the entire cycle of operation described is automatically carried out except that, in certain instances, it may be preferred to manually load and unload the work piece as will be later explained.

It will also be understood that the free unloaded position of the pivoted weighing table 31 is such that the intended rotation axis of a perfectly balanced work piece deposited and centered thereon will be vertical at the central or zero position of pointer 33. To effect this zero position of the pointer an adjusting means, not shown, may be provided as, for example, weights associated with the weighing unit for adjustment laterally in Fig. 4A. Damping means, not shown, may also be provided for damping the oscillation of the pointer 33 as, for example, a device fixed for oscillation with the weighing table and immersed in liquid, such as oil, or subjected to a magnetic field.

Figure 20:
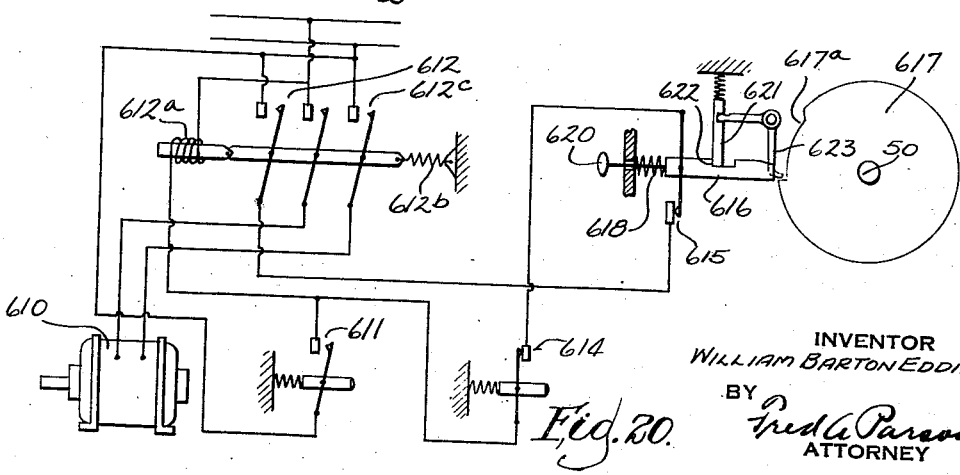
Figure 20 is a diagram of control mechanism for use in the machine of Fig. 4 when the work pieces are to be manually loaded and unloaded.

A shaft 50, Fig. 4, is driven from a suitable power source, as for example the motor shown in Fig. 20, through transmission mechanism, not shown, to make one revolution per cycle of the machine. Shaft 50 is utilized for timing various of the operation steps, as will be described, and particularly for the movement of the annular work carrier 32 to the various levels mentioned. For the latter purpose there is provided a suitable cam, such as 51, Fig. 4, having a cam groove such as 51a engaged by a follower roll, such as 51b, rotatably carried on an arm or lever, such as 52, which is pivotally mounted on frame 30 and has its end 52a engaging a suitable slot of a ram member 53 guided on the frame 30 for vertical movement. At its upper end the ram member 53 carries a substantially annular portion 53a engaging a complementary internal groove of the work carrier 32. The cam groove 51a is configurated to effect the stated vertical movements of the work carrier 32, and to retain the carrier at the different levels for the periods required for the cycle of machine operation.

Figure 5:
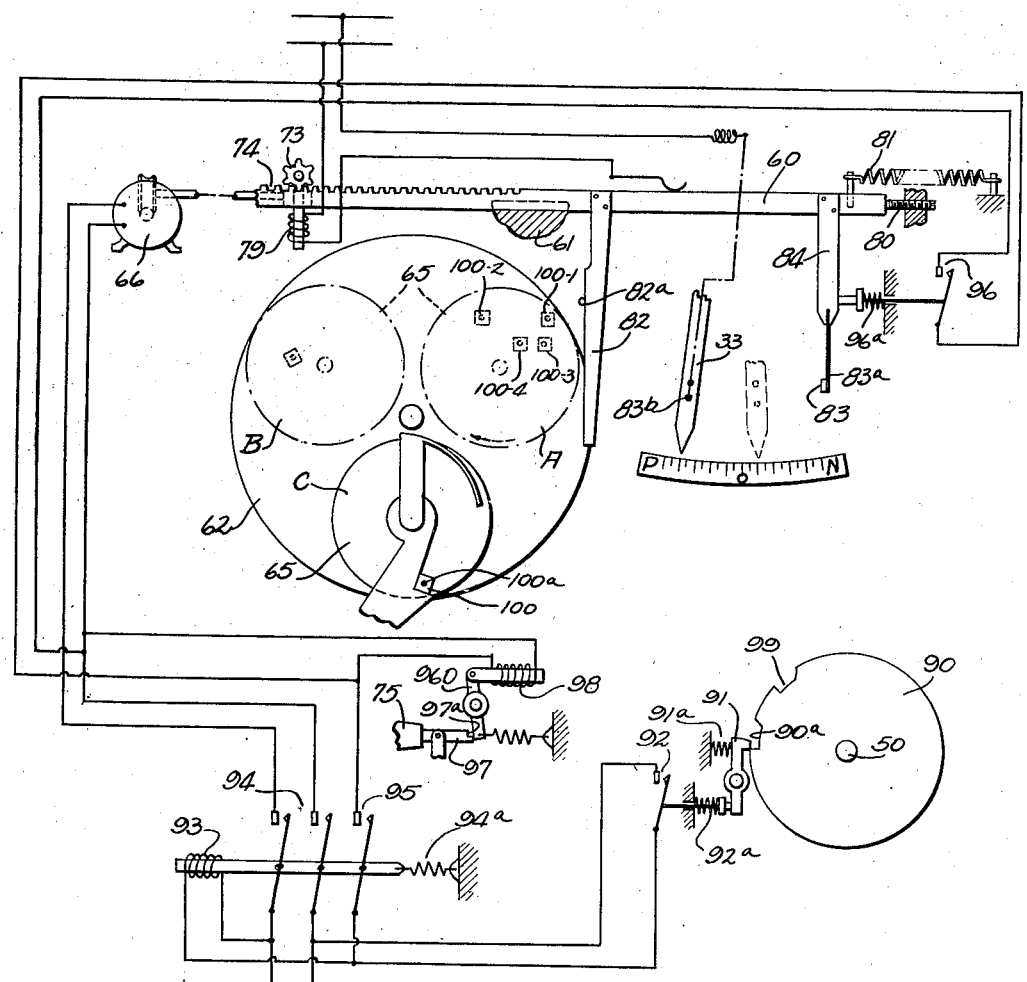
Figures 5, 5A are semi-diagrammatic views showing parts and their operating relationship for a device for establishing a control pattern of work piece unbalance in the machine of Fig. 4.
Figure 5A:
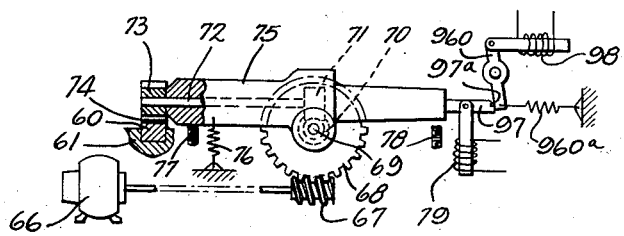

In Figs. 5, 5A there is diagrammatically shown some of the mechanism of the control pattern device 34 of Fig. 4, whereby the movement of pointer 33, Figs. 4, 5, is utilized for adjusting a control pattern member used for correction of the unbalance, as follows:

A reciprocable slide or bar 60, Figs. 5, 5A, which is guided on a support 61, is arranged adjacent to the pointer 33, Figs. 4, 5, and also adjacent to an indexible carrier 62 of the pattern device 34, upon which is carried a pattern disc 65 which is rotatable on an axis parallel to the index axis of carrier 62. Three 120° index movements of carrier 62, by mechanism later described, complete a cycle of carrier movement corresponding to the cycle of the machine, and progressively moves the pattern disc 65 through each of three positions A, B, C, to return to the C position.

The slide 60, Figs. 5, 5A, is moved in forward direction, to the left in Fig. 5, by the means of a motor 66 which is connectible to the slide by the means of a worm gear 67, a worm wheel 68 fixed on a shaft 69, a pair of meshed helical gears 70, 71, a shaft 72, a pinion 73, and a rack 74 fixed with the slide. The pinion 73 is carried by a frame or housing 75 which is pivoted about the axis of shaft 69 and urged by a spring 76 against a stop 77, in which housing position the pinion is in driving engagement with rack 74. At the end of the forward movement of slide 60, determined as later explained, the housing 75 is swung in the other direction against a stop 78 by the means of a solenoid 79, such movement disengaging the pinion 73, and the slide is then moved in reverse direction against a stop 80 by suitable means such, for example, as a spring 81. During the forward movement of slide 60 a face portion 82a of a bar 82, which is fixed for movement with the slide, sweeps forward to the left in Fig. 5, across the disc 65, which then occupies the indexed position indicated as A. Also during the forward movement an electric contact member 83, carried by a spring 83a on a bar 84 fixed for movement with the slide 60, moves forward to effect a closed contact with a contact member 83b carried on the measuring pointer 33.

The mechanism of Figs. 5, 5A controls the reciprocation of slide 60 as follows: A cam 90 is fixed on the shaft 50, which is timed to have one revolution per machine cycle as stated. Cam 90 is configurated as at 90a to release a pivoted lever 91, at a predetermined time in the machine cycle. Lever 91 is urged toward released position by a spring 91a and when released closes a pressure switch 92, normally held open by a relatively light spring 92a, thereby energizing a solenoid 93 to close a motor switch 94, normally held open by a spring 94a. The slide 60 is then in its right-hand position against the stop 80 and the pinion 73 is engaged with rack 74, as shown in Fig. 5, and upon the energizing of motor 66 through switch 94 the slide immediately starts movement to the left.

The closing of motor switch 94, Fig. 5, simultaneously closes a switch 95, and directly after the slide 60 starts to the left a pressure switch 96 is closed by a spring 96a, following which the solenoid 93 is energized through the switches 95, 96 independently of the switch 92. The lever 91 may then be returned to the position opening switch 92, by the means of the configuration of cam 90, the motor 66 continuing energized to move the slide 60 to the left.

At some time during such left-hand movement of slide 60, Fig. 5, the contact member 83 in the circuit of the solenoid 79 closes the solenoid circuit through the contact member 83b carried by pointer 33, whereby the housing 75, Fig. 5A, is swung to the position abutting stop 78 and disengaging pinion 73 from rack 74 on slide 60. When pinion 73 is thus disengaged the spring 81 starts movement of slide 60 to the right in Fig. 5. However, this movement interrupts the circuit of solenoid 79 and in order for the pinion to remain disengaged, whereby slide 60 will complete its return to initial starting position, other means are provided to maintain the housing 75 in the position disengaging the pinion, as follows:

A pivoted lever or latch 960, Figs. 5, 5A, is urged by a spring 960a in a direction to disengage the latch from a rod 97 fixed on the pivoted housing 75. But when the switch 95 is closed at the time of the starting of motor 66, as previously described, a solenoid 98 is energized which urges the latch in the direction to engage a notch 97a. At the moment, since housing 75 is in the position abutting stop 77, such engagement is prevented by abutment of the latch against the end of the rod, but when the housing is swung to its other position, abutting stop 78, the latch will engage the notch. The switch 95 remains closed, whereby to continue to energize solenoid 98 until the motor switch 94 is opened, which occurs at the completion of the right-hand movement of slide 60, when the bar 84, just prior to the abutment of slide 60 against stop 80 opens the pressure switch 96, thereby interrupting the circuit through solenoid 93. When solenoid 98 is thus de-energized at the end of the cycle the spring 960a immediately withdraws latch 960 from notch 97a and spring 76 then returns the housing 75 to its initial position against stop 77 and with pinion 73 engaging rack 74, but since the motor 66 is now de-energized no movement of slide 60 will take place until the cycle of slide movement is again started, as before.

From the preceding description of the operation of the cycle of movement of slide 60 it will be noted that the re-engagement of the pinion 73, just mentioned, completes the positioning of all the parts in their initial position for starting another cycle at a time determined by rotation of the cam 90. The operation cycle of the machine of Fig. 4 requires two of such reciprocatory movements or cycles of slide 60, respectively during the time when the pointer 33 occupies its different positions of the first and second measurement of unbalance in the operating cycle previously described. The first cycle of slide 60 has just been described. The second cycle is the same except that the reversal of slide movement from left to right, Fig. 5, takes place at a point determined by the new position of pointer 33, as for example in the dotted line position, Fig. 5, during the second unbalance measuring operation. The second cycle is initiated in proper timed relation similarly to the first cycle, as by a second configuration 99 of the cam 90.

Figure 6:
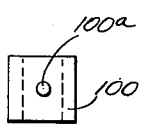
Figures 6, 6A are respectively top and side views of a pattern block used with the pattern device of Fig. 5.
Figure 6A:

The pattern disc 65, Fig. 5, carries a pattern block member such as 100, such block being square in lateral dimensions and relatively thin as shown in Figs. 6, 6A. The block provides an upstanding round rod portion 100a axially vertical and centrally positioned relative to the square sides, and is cut away on the bottom face as at 100b, partly to avoid rocking and also to provide magnet poles, the block being permanently magnetized. The block may be shifted about to any position on disc 65, but, being magnetized as mentioned, will normally be retained wherever positioned.

As later explained, when the pattern disc 65 occupies the position C, Fig. 5, and is about to be indexed to position A, the block 100 has been returned to what may be termed an initial position relative to the disc, as indicated. The subsequent indexing of support 62 through 120° to effect the disc position A carries the block along with the disc in the same relative position, but the block now has one of its side faces substantially parallel with the face 82a of the bar 82, as at 100—1, Fig. 5. Following such indexing, the first unbalance measuring operation having meanwhile been initiated whereby to position pointer 33 in, for example, the full line position shown in Fig. 5, the cam 90 initiates the first cycle of reciprocatory movement of slide 60, previously described, and the relative proportion and movement of the parts is such that the forward sweep of arm face 82a positions the block 100 as at the dotted line position 100—2, Fig. 5, for its center to be spaced a distance from the disc radius line marked 0° on the diagram exactly proportional to the $wx$ value on a force diagram of the unbalance such as Figs. 1A, 3A, that is to say, exactly proportional to the deflection of pointer 33 from its zero position. The block will be positioned at the one side or the other of the zero degree radial line of the A position disc, Fig. 5, accordingly as the pointer reading for the first unbalance measurement is in the positive direction P, or in the negative direction N.

Following the positioning of the block 100 in the position 100—2, Fig. 5, the work piece on carrier 32 and the disc 65 in position A are both rotated 90°, by mechanism later described, the disc being rotated in the direction indicated by the arrow, the disc rotation in the present instance positioning the block as at 100—3. Shortly following such positioning of the block the second unbalance measuring operation takes place with the work piece also turned 90° as stated, and the cam portion 99 of the cam 90 initiates the second cycle of forward movement of the slide 60. Since the first cycle of forward movement of arm face 82a positioned one side of the block exactly parallel with the arm face, the 90° indexing of the disc leaves the block with the side adjacent the arm face exactly parallel thereto, and the second cycle will not disturb the first setting of the block relative to the 0° radial line. In this second cycle of forward slide movement the pointer 33 may stand in any position of its range of movement determined by the unbalance in the work piece as, for example, in a negative position indicated by the dotted lines, Fig. 5, but whatever the pointer position, the forward movement of the arm face 82a will position the block 100 as at the position 100—4, with its center at a distance from the 90° radius of the disc which is proportional to the $wy$ value of the force diagrams, such as shown in Figs. 1A, 3A.

It will be apparent that in the position 100—4 of the block 100, established as described, the position of the center or rod portion 100a of the block relative to the axis and 0° radial line of the pattern disc which occupies position A establishes what may be termed a mechanical pattern of a force diagram such as the diagrams Figs. 1A, 3A, the pattern device operating as a recording device which records a resultant having an angular value corresponding to the angular position of the work piece unbalance and a radial value corresponding to the moment of unbalance. In other words the center of the block stands on a radial line of the disc corresponding to the angular position of any unbalance in the measured work piece. Also, the radial distance of the center of the block from the disc axis represents the value $wr$ of the force diagram. Such mechanical pattern or recording of the unbalance is used for controlling correction of the unbalance as will be described.

The machine of Fig. 4 includes mechanism for effecting various movements of the carrier disc 62 and control pattern disc 65, both for effecting the pattern of unbalance as described, and for other control purposes, suitably timed with the other movements of the machine, as follows:

Referring to Figs. 7, 8, a drive shaft 115 is driven through suitable transmission mechanism, not shown, from the same power source as the shaft 50, Fig. 4, and continuously reciprocates a slide rod 116, the rod being guided for right and left-hand movements, Fig. 7, and reciprocated by a worm 117, a worm wheel 118, a crank 119 fixed with the worm wheel and a connecting rod 120 pivoted at the one end on the crank and at the other end on a cross-arm member 121 which is rigidly fixed with the slide rod 116. At its one end the cross-arm 121 has rigidly fixed for reciprocation therewith an arm or bracket 122 carrying a timer and actuator unit generally denoted by the numeral 123.

The reciprocatory unit 123, Figs. 7, 9, 9A, 9B includes a plurality of sets of actuator dogs and control cams therefor, the sets being respectively denoted as 124, 125, 126, 128. The set 128, shown in Fig. 9B, is illustrative of each of the sets. For each set there is provided a pair of cams such as 129, 130 respectively fixed on cam shafts 131, 132, which are rotatably mounted in the frame of the unit 123 and geared together for opposite directions of rotation by the meshed gears 133, 134, the cam shaft 131 having fixed therewith a ratchet wheel 135. As best shown in Fig. 7, a ratchet operating dog 136, which is pivoted on the frame, is adapted to engage ratchet wheel 135 at each reciprocatory movement of unit 123 to the right in Fig. 7 and operates to turn the ratchet wheel, together with the cams of the various cam sets through an angular movement corresponding to the angular spacing of the teeth on the ratchet wheel. Each cam pair of the different sets is provided with suitable configurations such as 129a, 130a, Fig. 9B, operable to effect pivotal movement of a pair of cam dogs such as 138, 139 whereby to selectively position either dog with its inner end raised upwardly by suitable means, such as springs, not shown, to effect a pushing engagement with an abutment block, such as 140, carried by a slide such as 141 which is reciprocably guided on the machine frame. When the cams of a pair of dogs are in a position where neither dog is operative, the corresponding slide remains stationary in the position where last shifted, until the reciprocatory movements of the unit 123 have turned that cam set to raise one of the dogs to abutting position.

It will be apparent that, by the means of the different sets of actuator dogs and cams of the unit 123, slides, such as the slide 141, respectively associated with the different dog sets, may be moved in either direction during any reciprocatory movement of the unit 123, or may remain stationary at either end of the reciprocatory slide movement while the unit 123 effects one or more cycles of reciprocation, accordingly as the cams are configurated.

The dog-cam set 124, Fig. 9A, of the unit 123 operates a reciprocably guided slide 142, Figs. 9–10, in the manner previously described, the abutment block 142a for this slide being offset from the slide as shown in Fig. 9. The dog-cam sets 125, 126, 128 respectively similarly operate slides 143, 145, 147, the slide 143 being relatively short, as best shown in Fig. 10, and guided on a bar 143a which is fixed with the machine frame.

The pattern disc carrier 62, Figs. 5, 8, 11, is supported from the machine frame for successive 120° index rotation in the direction of the arrow, Fig. 8, and for vertical movement, Figs. 7, 11. A part 150 is fixed with a frame member 151 and journals one end of a sleeve 152 providing a bore which rotatably carries a shaft 153. The shaft 153, an index disc 154, Figs. 11, 11B, a hub or sleeve 155 and the carrier 62 are rigidly fixed together for unitary rotary index and vertical movements. Such vertical movement is effected from the reciprocatory movement of the slide 145, Figs. 9, 10, by mechanism as follows: At its right-hand end, Fig. 10, the slide 145 is provided with angular rack teeth such as 156 engaging complementary teeth of a segment 157 fixed on a shaft 158, whereby to turn shaft 158 as the slide is moved endwise. The shaft 158 effects vertical movement of the unit of carrier 62 through a lever 159, Figs. 7, 10, fixed on the shaft, a connecting rod or bar 160 pivoted to the lever 159 and also to a lever 161 fixed on a shaft 162, Figs. 7, 11, and another lever 163, fixed on the shaft 162, which operates on the lower end, Fig. 11, of shaft 153 to lift the carrier unit in the one direction of lever movement, the unit being urged downward by gravity, or by suitable springs not shown, in the other direction of lever movement.

The 120° indexing movements of the carrier 62, Figs. 5, 8, are effected by the reciprocatory movement of the slide 147, Figs. 9, 10, the slide having fixed therewith a rack 170, Figs. 10, 11, engaging a gear segment 171 which is fixed on the index sleeve 152. The index sleeve 152 also has fixed therewith an actuator arm 172, Figs. 11, 11B, carrying an actuator portion 172a. During the upward movement, previously described, of the shaft 153 and the unit carried thereby, the actuator arm 172a is engaged by one or another of spaced index slots 173, 174, 175 in the index plate 154. The index movement of the slide 147 and rack 170 takes place during such engagement, thereby rotating the carrier 120° in the direction of the arrow, Fig. 8, and subsequently, when the shaft 153 moves downwardly, the index plate 154 engages one or the other of spaced locating notches 177, 178, 179 with an angular point 180 on a post 181 which is fixed on the machine frame, being carried in this instance on an arm 182 fixed on the post 150. It will be seen that by the mechanism described the pattern disc 65 of the machine, Figs. 5, 8, may be indexed successively through the A, B, C positions there shown, by the reciprocatory movement of the slides 145 and 147, timed by the timer unit 123.

The pattern disc 65, whenever it occupies the A position, Figs. 5, 8, is indexed 90° on its own axis while the carrier 62 is in the lower position previously referred to, such 90° index being effected in part by the reciprocatory movement of the slide 142, Figs. 9, 10, and in part by the movement of the slide 143, as follows:

The pattern disc 65 has fixed therewith a stem portion such as 185, Fig. 11A, which locates the pattern disc on carrier 62, and a friction disc lower portion such as 186. When the pattern disc is in the A position the friction disc portion 186 stands above an index plate 187, Figs. 8, 11A, which is pivoted on a supporting plate 188. The plates 187, 188 together with a reciprocable bar or slide 189, Figs. 7, 8, are unitarily vertically movable, there being for this purpose two vertically reciprocable slides 190, 191, Figs. 7, 10, respectively having spaced guides 190a, 190b and 191a, 191b. At the upper end the slides 190, 191 carry bracket portions such as 190c, 191c, the slide 189 being slidably supported at each end in the bracket portions and the plate 188 being fixed with the bracket portion 191c, as shown in Figs. 9, 11A.

Referring to Fig. 10, the vertical slides 190, 191 each are provided with cam pin or lug portions indicated at 190d, 191d, engaging with angular cam slots such as 195, Fig. 10A, in the slide 142, and when the slide 142 is shifted to the right, to the position shown in Fig. 10A, each of the vertical slides 190, 191 is moved downwardly, together with the plates 187, 188 and slide 189 carried thereby, and vice versa.

The slide 189 is connected to be reciprocated from the slide 147, Figs. 9, 10, by the means of arms or brackets 196, 197, Fig. 7, respectively fixed on the different slides, the brackets being connected by a pivoted link 198. Slide 189 is also connected for its reciprocatory movement to effect pivotal movement of the index plate 187, Figs. 8, 11A, by the means of a pivoted link 199.

The reciprocatory movements of the slides 142, 143 and 147 are so timed by the timer and actuator unit 123 that the pivotal movement of plate 187 takes place to index the A position pattern disc 90° as stated after the sweeper arm 82, Fig. 5, makes its first forward or left-hand movement, as described, and before the second forward movement of the sweeper arm. The 90° index movement also takes place while the carrier 62 is in the lower position of its vertical movement and the supporting plate 188 is in its upper position Fig. 11A determined by movement of slide 142, as explained. Before the pivotal movement of index plate 187 is reversed to return it to starting position the plate supporting unit is lowered, whereby the pattern disc remains in the 90° indexed position. The A position pattern disc 90° index movement is in exact correspondence with the 90° movement of the work carrier ring 32, Figs. 4, 4A, previously referred to, as will later be further explained.

The pattern disc 65, Figs. 5, 8, while it occupies the B position is rotated from a shaft 210, Figs. 8, 9, in correspondence with the rotation, previously referred to, of the work carrier ring 32, Figs. 4, 4A, for angularly positioning the unbalance of the work piece relative to correction device 35. The connection for the rotation of the work carrier will be later described. The B position disc is driven from the shaft 210 through a worm and wheel 211, 212, Figs. 8, 9, and through a meshed pinion and gear 213, 214, meshed bevel gears 215, 216, and a sleeve 217, Figs. 9, 11A, the sleeve having the gear 216 fixed on its lower end, and a friction disc 218 fixed on its upper end, the friction disc 218 being rotatably supported at fixed height in the machine. Following the 120° index movement of carrier disc 62 the carrier disc moves downwardly as previously described, to the position shown in Fig. 11A, where the discs 186, 218 are frictionally engaged when the disc 65 is in the B position, and when shaft 210 is rotated the B position pattern disc is rotated.

The pattern disc 65, Figs. 5, 8, while it occupies the position C, is rotated whenever pattern disc carrier 62 is in its lower position, that is to say except when the carrier is raised for its 120° index movement. Such rotation is through a helical gear 220, Fig. 8, fixed on drive shaft 115; a helical gear 221, a shaft 222, Figs. 8, 11, a worm 223, a worm wheel 224 and a sleeve 225 carrying a friction disc 226 rotatably supported at fixed height in the machine. The described downward movement of pattern disc carrier 62 following its 120° indexing movement frictionally engages the discs 226, 186 whenever the pattern disc is in the C position.

The indexing of the pattern disc from the B to the C position, Figs. 5, 8, carries the pattern block 100 against an edge 230 of a stationary stop member 231, Figs. 8, 11, supported above the disc carrier 62. The rotation of the C position disc, as described, then carries the block 100 against a stationary sweeper arm 232 and finally positions the block in a notch 231a where it remains until the carrier disc 62 is indexed for moving the pattern disc to the A position.

The timed reciprocatory movement of the slide 147, which effects the 90° index movement of the A position disc, as described, also operates to correspondingly angularly rotate the work carrier 32, Figs. 4, 4A, and the work piece supported thereon, the mechanism for such work carrier rotation being as follows:

Slide 147, at its left end, Fig. 7, is provided with suitable rack teeth engaging a gear 240 supported on a shaft 241, the gear being connectible with the shaft by a suitable one-way clutch device denoted by the numeral 242, Fig. 7. The device 242 may be of any suitable well-known type for the purpose stated as, for example, with rollers such as 242a cooperating with a suitable hub and cam surfaces, not shown, respectively fixed on the shaft and gear, whereby the rollers lock the gear for rotation with the shaft in the direction of gear rotation corresponding to the direction of movement of slide 147 to the right, Fig. 7, which is the direction effecting the 90° indexing of the A position pattern disc. In the other direction of gear rotation, corresponding to the idle return movement of the slide 147, the gear does not rotate shaft 242.

The shaft 241 is connected by suitable motion transmitting mechanism, diagrammatically indicated at 241b, Fig. 7, with a shaft 245, Figs. 7, 4A, of a differential device, generally denoted as 246.

The periphery of work carrier 32, Figs. 4, 4A, is provided with gear teeth such as 247 engaging a driving gear 248 in any position of the vertical adjustment of the carrier, the gear 248 being connected to be driven from differential device 246 through a shaft 249. The differential device includes two worm gears 250, 251 respectively meshed with a worm 250a, which is keyed to the shaft 245, and with a worm 251a which is keyed with another shaft, as later described. The worm gears are respectively fixed with bevel ring gears 250b, 251b, these bevel gears each engaging bevel pinions such as 252, 253 which are rotatable on suitable bearing studs fixed on a ring member 254 which is keyed on shaft 249. The worm gears are sufficiently self-locking to prevent rotation of either gear except when its worm is rotated, and the arrangement and driving connection is such that the rotation of the shaft 245 and its worm 250a from the slide 147, as described, rotates the work carrier 32 through an angle of 90° at the same time that the A position pattern disc is indexed 90°, and in corresponding angular direction.

The other worm 251a of the differential device 246, Fig. 4A, is rotated at the same time that the B position pattern disc, Figs. 5, 8, is rotated, as follows:

Referring to Fig. 12, a shaft 260 is connected through suitable mechanism as indicated at 260a to drive both the shaft 210, which rotates the B position pattern disc as stated, and also to drive a shaft 261 which is keyed with worm 251a, Figs. 12, 4A, of the differential device 246 whereby to rotate the work carrier 32 and the work piece supported thereon.

The shaft 260 is driven from a motor 354, Fig. 12, through a shaft 355, a worm 356, a worm wheel 357, a shaft 358, a pair of helical gears 359, 360, a shaft 361, a pinion 362 and a gear 363 fixed on the shaft 260. Pinion 362 is mounted in a frame or housing 364 pivoted about the axis of the shaft 358 and urged against a stop 365 by a spring 366. In such frame position the pinion 362 is in driving engagement with the gear 363, but the housing may be swung to withdraw the pinion 362 from the driving engagement by a solenoid 364a which, when energized, swings the frame against a stop 367. A thin electric contact leaf 369 is arranged adjacent the B position pattern disc, the contact leaf being extended in the direction of the disc radius and in such angular relation as will effect the desired angular positioning of the pattern disc and work piece in the operation now to be described. The leaf is urged upwardly by a spring 370 to its full line position defined by a stop 371 but may be moved downwardly by a solenoid 372 to its dotted line position defined by a stop 373. In its lower position the contact leaf may effect a closed circuit with the center rod 100a of the pattern block 100 which is positioned on the B position disc, the circuit including a solenoid 374. A cam 376 on the timing shaft 50 provides a configuration 376a for releasing a pivoted lever 377, urged to released position by a spring 378, whereby to close a pressure switch 375 and energize the solenoid 372 to effect downward movement of the leaf 369. A trifle later in the machine cycle a cam 379 on the timing shaft 50 closes a pressure switch 380 by the means of a suitably positioned configuration 379a for releasing pivoted lever 381. Closing of pressure switch 380 energizes a solenoid 382 for closing a starting switch 383 for the motor 354. The pressure switch 380 remains closed only momentarily, but when switch 383 is closed a holding circuit through solenoid 382 may remain closed through a switch 384, provided a pressure switch 385 is also closed, the switch 385 being closed when the solenoid 364a is de-energized, whereby the frame 364 is in the position engaging pinion 362 to drive gear 363 and shafts 210, 261, this being the normal situation when the motor is energized, except as later pointed out.

Following the starting of motor 354, as described, the motor will then continue to run until the resulting rotation of the B position pattern disc rotates the pattern block 100 to effect the closed circuit through the contact leaf 369. The arrangement and operation of the parts is such that at this time the B position pattern disc and the work piece on the carrier 32 have been brought to predetermined angular position, and the closed circuit through leaf 369 and solenoid 374 then closes a switch 386, whereby to energize solenoid 364a to swing the frame 364 to the position disengaging the driving pinion 362, the resulting opening of the pressure switch 385 also de-energizing the holding circuit of solenoid 382 whereby to stop the motor. The configuration 376a of cam 376 is such that pressure switch 375 remains closed, whereby the contact leaf 369 remains in dotted line position, during sufficient time for a complete revolution of the B position pattern disc from motor 354 if so much is required, but following such interval the timing cam 376 opens the pressure switch 375, whereby the leaf returns to its upper full line position, and the mechanism of Fig. 12 is then in initial position for the next succeeding similar cycle of operation.

However, when the cam 376 closes pressure switch 375 to move the contact leaf 369 downwardly, as stated, the leaf may at that time effect the closed circuit of solenoid 374 through pattern block 100, since the pattern block may stand in any angular position on the B position pattern disc, as determined by the previously described block locating operation when the pattern disc was in the A position. The arrangement and operation of the parts is such, however, that this condition can occur only when the B position pattern disc and the work piece are already in the desired angular position, whereby no present rotation of either the work piece or the pattern disc is required. Such rotation cannot then take place because the closing of the circuit through solenoid 374 closes the switch 386 to energize solenoid 364a whereby to disengage the pinion 362. The motor 354 will subsequently start when the pressure switch 380 is closed as described, but this will have no effect because of the pinion disengagement, and the motor switch will almost immediately again be opened, since the configuration 379a is such that pressure switch 380 is opened after only slight further rotation of cam 379, and in the then position of the housing 364 the pressure switch 301 is open, whereby the motor switch holding circuit through switches 300, 301, is inoperative.

It will be understood that the operation of the device of Fig. 12, just described, effects a predetermined angular position of the work piece unbalance relative to the correction device 35, Fig. 4, and at the same time effects a predetermined angular position of the B position pattern disc, as determined by the angular location of the contact leaf 282, Fig. 12, relative to the machine frame.

In the machine of Fig. 4 the correction unit 35 comprises a driller unit shown in Figs. 13, 14, 15. This unit is carried by the machine frame, as shown in Fig. 4, and positioned for the drill to operate at a point in the radius line of the unbalance, which has been brought to angular alignment with the driller unit, as described for the device of Fig. 12.

The driller unit includes a base 390, Figs. 4, 13, fixed with the frame 30 of the machine. A slide 391 is guided on base 390 for reciprocatory movement parallel with the axis of a drill 392 which is carried by a drill spindle 393 rotatably carried by a non-rotatable sleeve 394, the spindle being fixed against axial movement relative to the sleeve. The sleeve 394 is guided in slide 391 for reciprocatory movement relative to the slide and parallel with the drill axis, the sleeve and drill being also bodily reciprocable with the slide.

A motor 395 fixed on base 390 rotates the drill spindle through a train including gears 396, 397, a shaft 399 and gears 400, 401, the gear 401 having a hub portion which is slidably keyed with the extended end of the drill spindle. The slide 391 is connected for reciprocatory movement relative to base 390 from a piston device 402 having a piston 402a.

The spindle sleeve 394 is connected for reciprocatory movement relative to slide 391 from a piston device 403 having a piston 403a and a piston rod 403b, the piston rod and the sleeve 394 each having suitable rack teeth engaging an idler gear 404. The depth to which the drill enters the work is determined as later explained by the angular adjustment of a depth gauge cam 405 fixed on a shaft 406, the cam being positioned for abutment by an end of the piston rod 403b. The slide 391 may be locked in position relative to the base 390 by a clamp piston device 407 having a piston 407a, and the depth cam 405 may be locked in angular position by a clamp piston device 408, having a piston 408a.

The driller unit has a cycle of operation which includes a rapid advance of the drill to contact the work surface while the drill is not rotating, followed by drilling to a depth determined by the radial position of the pattern block 100 on the B position pattern disc, and subsequent rapid return of the drill to its withdrawn position, and during the drilling the work piece is clamped in position and supported against the thrust of the drill, as will be explained.

Figure 16:
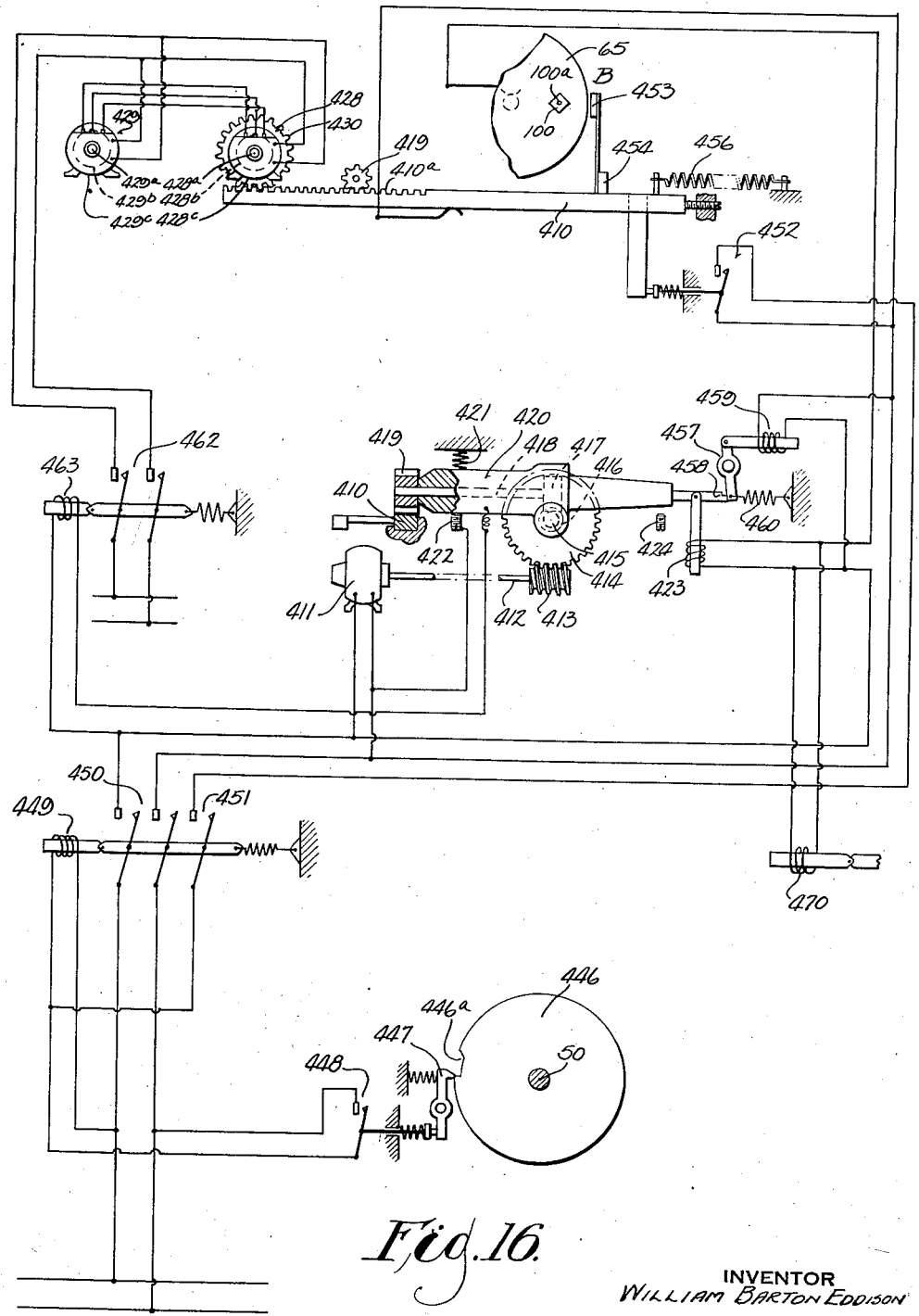
Figure 16 is a diagram showing parts, and their operating relationship, of controlling and actuating mechanism provided in the machine of Fig. 4 for controlling the amount of unbalance correction effected by the driller unit of Figs. 13, 14.

The unbalance correcting cycle just mentioned is initiated and controlled for amount of unbalance correction as follows: Referring to Fig. 16, a slide or bar 410 having rack teeth 410a, and arranged adjacent to the B position pattern disc, Figs. 8, 16, may be actuated in forward and reverse directions from a motor 411, through a shaft 412, a worm 413, a worm wheel 414, a shaft 415, helical gears 416, 417, a shaft 418 and a pinion 419 engageable with the rack teeth 410a. The pinion 419 is mounted on a pivoted housing or frame 420 which may be swung about the axis of shaft 415, in the one direction by a spring 421 against a stop 422 to engage the pinion and rack, or in the other direction by a solenoid 423 against a stop 424, whereby to disengage the pinion.

The forward movement of the slide bar 410, Fig. 25, operates a position copying device to position the depth cam 405, Figs. 4, 13, of the driller unit in accordance with the unbalance pattern on the B position pattern disc. In the present instance the position copying device is of well-known electrical type in which a primary unit such as 428, Fig. 16, includes a shaft 428a, a rotor 428b and a stator 428c, and a similar secondary unit 429 includes a shaft 429a, rotor 429b and stator 429c. The shaft of the primary unit 428 is connected to be rotated from the slide 410 by a gear or segment 430 engaging suitable rack teeth on the slide which may be the same rack teeth 410a used for pinion 419. The shaft of the secondary unit 429 is connected to the shaft 406 of drill depth cam 405 of the driller unit through a gear or segment 430 and pinion 431, as shown in Fig. 14. When the position copying units are energized from a suitable power line the rotor of the secondary unit moves to corresponding angular position, relative to the stators, with the rotor of the primary unit. It will be understood that other types of position copying devices might be used to effect the same result, including suitable forms of mechanical or hydraulic devices, not shown.

Referring to Fig. 16, the cycle of operation of the correction unit 23, Fig. 4, is initiated by a cam 446 fixed on the timing shaft 50 and having a configuration 446a for release of a pivoted lever 447 to close a pressure switch 448 whereby to energize a solenoid 449 and close a starting switch 450 of the motor 411. Closing the switch 450 also closes a switch 451 which provides a holding circuit for solenoid 449 through a pressure switch 452 provided the switch 452 is closed. The starting of the motor, as described, starts the forward movement of slide 410 to the left in Fig. 16, and shortly thereafter the pressure switch 452 is closed and motor 411 continues to run, although the configuration 446a of cam 446 opens switch 448 shortly after switch 452 is closed.

After motor 411 is started, as described, the slide 410 continues its forward movement until a contact is effected between a contact member 453 carried on an arm 454 of the slide and the central lug or rod 100a of the pattern block 100 on the B position pattern disc, whereby to close a circuit through the solenoid 423 and disengage the pinion 419 from the slide rack 410a, whereupon the slide 410 is returned to starting position by suitable means such as a spring 456. It will be understood that the travel of the slide 410, Fig. 16, is so directed that the forward movement, that is to say to the left in Fig. 16, carries the contact member 453 toward the center of the B position pattern disc along a radius of the disc which corresponds to the radius line of the unbalance in the work piece as established by the device of Fig. 5 while the disc was in the A position, the pattern block while in its B position having been rotated to predetermined angular position relative to the slide 410 by the device of Fig. 12, as explained. The point in the travel of bar 410 where the contact of member 453 and rod 100a of the pattern block interrupts the forward movement of slide 410, therefore, represents a point such as $w$ or $w'$ in the diagonal of a force diagram such as shown in Figs. 1A, 3A, establishing a predetermined value of the correction required at the corresponding point in the work piece, such value being used for adjusting the depth gauge cam 405 of the correction driller unit.

The circuit just mentioned is only momentary, and to maintain the pinion 419 disengaged during the slide return movement other means are provided, including a pivoted latch 457 engageable in a notch 458 by the means of a solenoid 459 against the resistance of a spring 460 in a manner corresponding to the similar latch of the device of Fig. 5. The solenoid 459 is energized whenever motor switch 450 is closed, but during the forward movement of slide 410 cannot engage the notch by reason of the interfering shoulder of the notch, as shown. However, as soon as the solenoid 423 has pivoted the housing 420 to disengage pinion 419 during the return movement of slide 410 the solenoid 459 effects the notch engagement, the latch 457 then continuing to hold the housing in pinion disengaged position until the return movement of the slide is completed, as mentioned. At the completion of the slide return movement the pressure switch 452 of the holding circuit is opened, whereby to de-energize solenoid 449 and the motor switch 450, which also de-energizes the solenoid 459, permitting the spring 460 to withdraw latch 457, and the spring 421 then operates to again engage the pinion 419 with rack 410a, the parts then being positioned for starting another similar cycle of forward and reverse movement of slide 410 when another work piece is subsequently operated upon.

The position copying devices 428, 429, Figs. 16, 14, which, as stated, position the driller depth cam 405 in accordance with the unbalance pattern of the B position pattern disc, are energized through a switch 462, Fig. 16, which may be closed by a solenoid 463, but only when slide 410 is moving in a forward direction, the circuit of the solenoid being effected through the motor starting switch and through contacts respectively on the stop 422 and on the housing 420. During forward movement of slide 410 the switch 462 is closed and the rotor of the secondary unit 429 follows the angular movement of the primary unit, but when the housing 410 is pivoted, as described, to disengage the pinion 419 at the end of the forward slide movement the solenoid 463 is de-energized and switch 462 is opened. The rotor of primary unit 428 is geared, as described, to follow both the forward and return movement of the slide but the interruption of the energizing circuit of the copying device leaves the rotor of the secondary unit 429 and driller depth cam 405 in angular position corresponding to the unbalance moment of the work piece. Following completion of the driller unit cycle, later described, but only when the actuating circuit and copying device circuit is again established at the beginning of another succeeding cycle of similar movement, the rotor of secondary unit 429 moves to the angular position of the rotor of primary unit 428 and during the succeeding cycle again follows the forward movement of the slide 410.

Following forward movement of the slide 410, Fig. 16, as described, the described drilling cycle of the driller unit shown in Figs. 13, 14, 15, is next initiated by a solenoid 470, Figs. 15, 16. Referring to Fig. 16 the solenoid 470 is energized by the same circuit, previously described, as the solenoid 423 and establishes the starting of the drilling cycle as the point in the correction cycle where the drill depth cam 405, Figs. 4, 13, 15, has been positioned and the pinion 419, Fig. 16, is disengaged for the return movement of slide 410. The energizing of solenoid 470 shifts a control valve 477 to the left of its central position shown in Fig. 15. The circuit of solenoids 423, 470 are only temporarily closed, as mentioned, but the valve is yieldably retained in its left-hand position by detent mechanism such as 477a. Pressure fluid is continuously supplied for operation of the device of Fig. 15 from a reservoir 481a, there being a continuously driven pump 481 delivering fluid to a supply line 482 through an overload relief valve 481b.

The described left-hand movement of valve 477, Fig. 15, admits pressure fluid from the channel 482 through a port 477b to the piston device 408, Figs. 14, 15, which clamps the depth cam 405 in the position established by the device of Fig. 16, as described, the piston 408a remaining clamped until the valve 477 is shifted to the right at the conclusion of the drilling cycle as later described, at which time the clamp is released by a spring 484.

The left-hand movement of valve 477 also admits pressure fluid for an initial forward movement of slide 391, Figs. 14, 15. The slide is continuously urged in the other direction, to the left in Fig. 15, by pressure fluid acting on the smaller area end of piston 402a, but when valve 477 is positioned to the left pressure fluid is applied to the larger end of the piston through port 477b, a valve device 485 which is then in the position shown in Fig. 15, and a channel 486. The valve device 485 includes a plunger 485a urged to the left by a spring 485b, but during the right-hand position of valve 477 occurring at conclusion of the preceding driller cycle the plunger has been forced to the right to the position shown, by pressure fluid through a port 477c. When the pressure is released on port 477c by the described shifting of valve 477 to the left the plunger 485a is retained in its right-hand position, except as later explained, by a pivoted spring operated dog or latch 488, and pressure fluid will then pass to piston 402 through channel 486 and effect forward movement of slide 391, as stated.

The forward movement of slide 391 to the right in Fig. 15 takes place while the drill 392, Figs. 13, 15, is not rotating. The drill, and its spindle sleeve 394, is continuously urged to its retracted position relative to slide 391, shown in Fig. 15, by fluid pressure from line 482 acting on the smaller area end of piston 403a. The forward movement of slide 391 with the drill retracted continues until the drill strikes the work piece supported on the work carrier 32, Fig. 4, which is then in its uppermost position, and the slide cannot then travel farther. The pressure in line 486 then rises whereby to operate a plunger 489a of a pressure valve 489 against the resistance of a spring 489b. At a predetermined pressure level valve plunger 489a opens a port 489c for fluid to pass from line 486 to a line 490 and thence to the piston 407a, Figs. 14, 15, to clamp the slide 391 in whatever position where the non-rotating drill contacts the work piece. When pressure is released in line 490 at the conclusion of the drilling, as later described, the clamp is released by a spring 491.

Simultaneously with the clamping of slide 391, as described, the pressure fluid in channel 490 operates a piston device 492, Figs. 13, 15, to start the drill motor 395. A motor starting switch 493 is urged to open position by a spring 494 but will be closed to start the motor when fluid pressure is applied to the piston device 492 as mentioned. When pressure is relieved in channel 490, as later described, the switch will again be opened to stop the motor.

Following starting of the drill motor 395, as described, the piston device 403, Figs. 13, 15, is operated for feeding forward the drill sleeve 394 and drill 392 relative to the clamped slide 391, as follows: A feed fluid supply pump 496, Figs. 13, 15, is fixed on support 390 to be driven by the motor 395, as for example, by a gear 496a engaging the pinion 400. Pump 496 may be of any suitable type, preferably of high pressure type delivering a small volume as compared with pump 481, whereby the feed rate is relatively slow as compared with the initial forward movement and the reverse movement of the drill. Pump 496 draws fluid from a reservoir 497 and delivers fluid to the large area end of piston 403 through an adjustable relief valve 498, channel 499, a valve device 500 and a channel 501. The valve device 500 includes a plunger 500a urged by a spring 500b to a position shown in Fig. 15 where the fluid in channel 499 is returned to reservoir 497 and channel 501 also drains to the reservoir, but following the clamping of slide 391 and starting of the drill motor the pressure rises in channel 490 as described and at a predetermined pressure level the plunger 500a will be forced to the left to a position where the return flow to the reservoir is blocked and channel 499 communicates with channel 501, whereby to start the forward feed motion of the drill, to the right in Fig. 15. When pressure is relieved in channel 490 as later described the plunger returns to the position shown in Fig. 15 to again connect the channels 501 and 499 to drain to the reservoir, whereby the constant pressure on the small area of piston 403a returns the drill to the retracted position, shown in Fig. 15.

During forward feeding of the drill as described the end of the piston rod of piston 403a will abut the depth cam 405, Figs. 13, 15, thereby establishing the amount of unbalance correction material removed from the work piece. When this occurs piston 403a and drill 392 can feed no further and the pressure rises in channel 501 to operate a plunger 504a of a pressure valve 504 against the resistance of a spring 504b. At a predetermined pressure level the movement of the plunger admits fluid to a channel 505 whereby to operate a piston device 506 to trip the latch 488.

Following tripping of the latch 488, Fig. 15, as described, the valve plunger 485a is forced to the left of the position shown, by spring 485b. In the position of valve 485 as shown pressure fluid from line 482 through a channel 507 is cut off from a channel 508 which is then connected to a drain, but when valve 485 shifts to the left the channels 507, 508 communicate and a piston device 509 shifts valve 477 to the right. The valve then remains in the right-hand position until again shifted to the left by solenoid 470 at the start of another drilling cycle as described, but valve 485 is immediately returned to the right by pressure fluid from port 477c. However, in the new position, with both valves 477 and 485 in right-hand position the channel 486 is open to a drain through port 477b and a drain port 477d. In the meantime, as later described, fluid pressure has been relieved in channel 505 and on piston device 506, whereby latch 488 again retains valve member 485a in its right-hand position, and whereby fluid pressure is drained from channel 508 and piston 509 will not operate to oppose the next left-hand movement of valve 477 when another drilling cycle is initiated for the next work piece.

When channel 486, Fig. 15, is drained, as described, pressure is immediately relieved in channel 490 by the return of piston device 489 to the position shown and by drain of fluid through a one-way valve such as 510, whereby piston device 492, Figs. 13, 15, moves to open the drill motor switch 493, also slide 391 is unclamped and valve 500 returned to the position shown in Fig. 15, draining the channel 501. Both the slide 391 and the drill are now returned to their retracted positions by the constant fluid pressure acting on pistons 402, 403, as described. The connection of channel 501 to the drain also drains the channel 505 through a one-way valve 511, whereby spring 488a may act to return the dog 488 to the position shown. Connection of port 477b to the drain as described also unclamps the piston device 408 and the drill unit parts are then all in initial position for the starting of another cycle when solenoid 470 is next energized for starting another drilling cycle except that, as stated, the stop cam 405 does not return to initial position until the next cycle has started.

Figure 17:
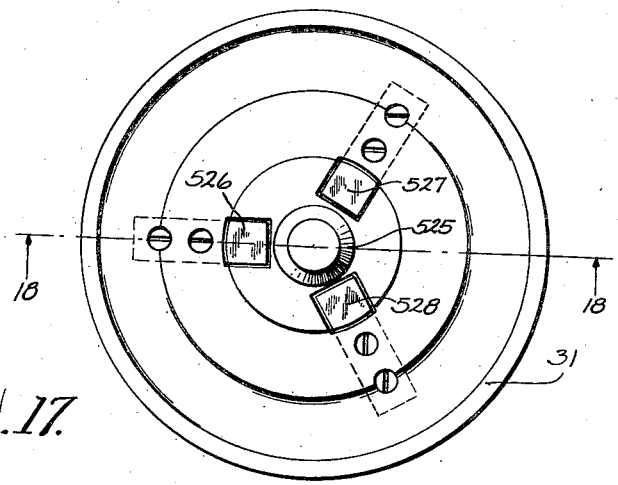
Figure 17 is a top view of an unbalance weighing table shown in Fig. 18, together with associated work locating and clamping mechanism.

The mechanism, Figs. 4, 17, 18, for locating and clamping the work on weighing table 31 will now be described.

The work piece 20, here used for illustrating the operation of the machine, has a central bore 20b and an annular recess 20c. The recess 20c is in this instance the preferred gauge surface for centering the intended axis of work piece rotation on the weighing table. The bore 20b is, however, utilized for approximately centering the work as it is being lowered to the weighing table, as previously described, there being a centering rod 525 centrally fixed with the table 31 to engage the bore. This locates the recess 20c outside the exposed movable jaw portion, such as 526a, of three clamp members 526, 527, 528 which are then in unclamped position. The clamp members being similar in construction and operation only the member 526 will be described.

Clamp member 526 has a portion 526b rigidly fixed on the under side of the weighing table and a portion 526c which carries the jaw portion 526a and is pivoted on portion 526b by a resilient spring portion 526d. At the lower ends, the portions 526b, 526c are connected to an actuator member 529, respectively by flat springs 530, 531, the spring ends being rigidly fixed at each end with the associated members as shown.

Figure 18:
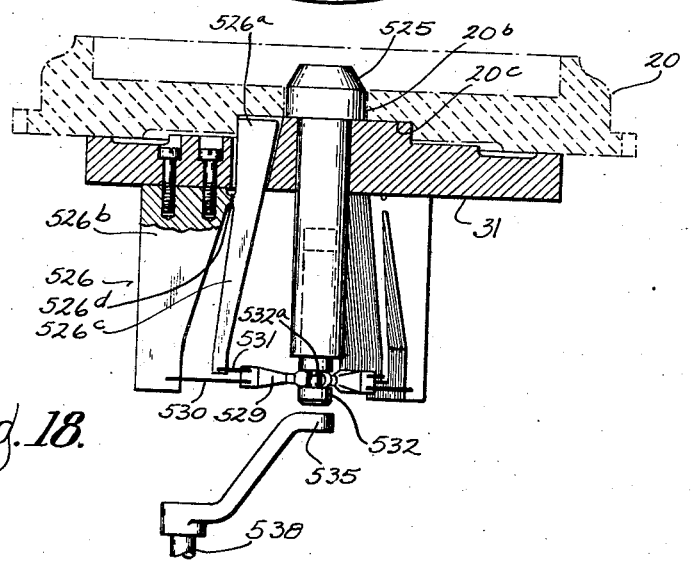
Figure 18 is an enlarged view of a weighing table shown in Fig. 4 and certain associated mechanism, mostly in section along line 18—18 of Fig. 17.

The several members such as 529, Fig. 18, respectively associated with the different clamp members 526, 527, 528 each have an end portion engaging an annular groove 532a in a vertically movable plunger 532. The arrangement is such that except when plunger 532 is forcibly upwardly shifted as later described, the springs such as 530, 531 exert a clamping action, similar to the action of a toggle at a point near its straight line position, simultaneously urging each of the jaw portions such as 526a in a direction to engage and clamp on the interior of the recess 20c of the work piece. The several clamp members and their operating members being alike and each restrained to follow corresponding movements relative to the table center and with equal pressure, the clamping movement of the jaw portions will locate the clamped work piece exactly in the predetermined unbalance weighing position.

Figure 19:
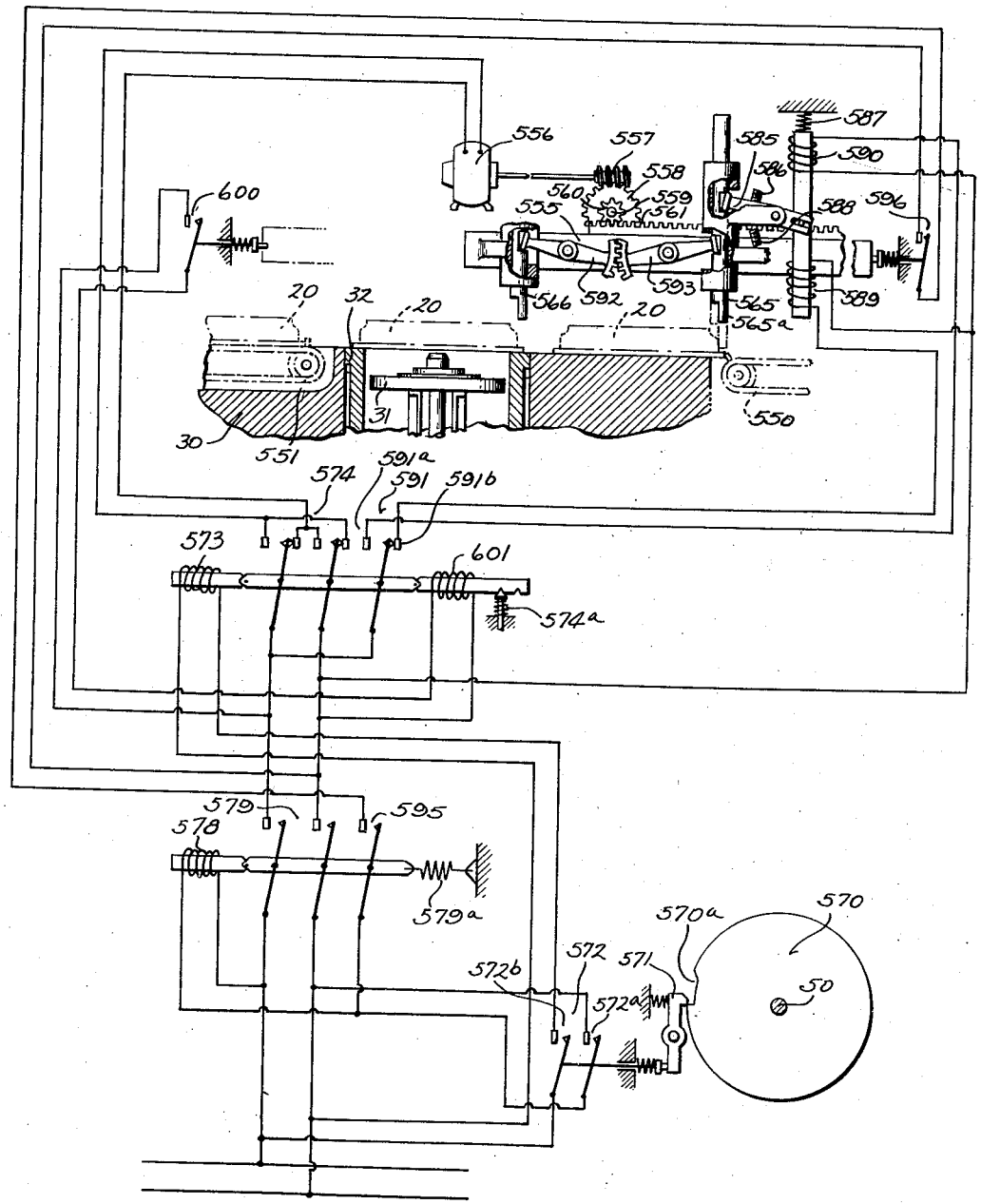
Figure 19 is a diagram of a transfer device used in the machine of Fig. 4 for movement of work pieces to the loading position, and subsequently removing them, after they are balanced.

At such times as the work piece is being lowered onto or raised from the weighing table 31, as previously described, the clamp jaw members such as 526a are shifted inwardly to a position disengaging the work piece by the upward movement of an actuator member 535, Figs. 4, 18, which forces plunger 532 upwardly from the position shown to effect the result stated. For operation of the actuator member 535 in proper timing with the other functions of the machine there is provided a cam 536, Fig. 4, having suitable configuration for operating a pivoted lever 537 for vertical movement of a rod 538, Figs. 4, 18, which carries the actuator 535. The cam 536 is fixed on a shaft 539 connected by suitable transmission mechanism, not shown, for one revolution of shaft 539 during the same period as one revolution of the timing shaft 50.

Where the operation of the machine is to include the automatic loading and removal of the work pieces, a device diagrammatically shown in Fig. 19 may be used, as follows:

The device of Fig. 19 is used for horizontal transfer of the work pieces 20 from the right-hand position there shown to the position depositing the work piece on the vertically movable carrier 32, Figs. 4A, 19, which, at the time of such transfer, is in the position shown in Fig. 19, with the top of the carrier level with the top of the machine base. While the work piece is on the carrier the balancing cycle is carried out as has been described and, at the end of the balancing cycle the work carrier 32 and the work piece thereon are again in the vertical position shown in Fig. 19. Before the next balancing cycle is initiated the balanced work piece is transferred to the left-hand position, partly indicated in Fig. 19, and another work piece is deposited on the work carrier. Additional work pieces may be successively deposited in the right-hand position of Fig. 19, and finished work pieces successively removed from the left-hand position by suitable conveyor means, indicated in part at 550 and 551, timed from shaft 50 if desired, but since a variety of such conveyors are well-known they will not here be described.

In the device of Fig. 19 a slide 555 is suitably guided for horizontal reciprocatory movement adjacent to the work carrier 32. The slide 555 is actuated through a cycle of forward movement, to the left in Fig. 19, and reverse movement by a reversible motor 556, driving through a worm 557, a worm wheel 558, a shaft 559, a pinion 560 and a rack 561 which is fixed with the slide. During the forward, or left-hand movement of the slide spaced actuator plungers 565, 566 are in a lower positon, indicated by dotted lines for plunger 565, in which position plunger end portions such as 565a engage behind the work pieces to force both the fresh work piece and the finished work piece to the left, such movement depositing the new work piece on the carrier 32, as stated. At the end of the forward movement the actuator plungers are withdrawn upwardly and the slide is returned to the right, to the initial position shown in Fig. 19.

The cycle just mentioned is controlled by the following mechanism. A timing cam 570, Fig. 19, is fixed on the shaft 50 and is configurated at 570a to release a pivoted lever 571 which is urged to released position by a spring 571a, the release of the lever operating a pressure switch 572 to effect contacts at 572a, 572b. Later in the rotation of cam 570 the cam forces lever 571 back to the position shown and the contacts are again interrupted. The temporary contact at 572b energizes a solenoid 573 whereby to shift a motor reversing switch 574 to the left from the position shown, to a position for effecting travel of the slide 555 to the left, the switch being yieldably retained in the left position by a detent mechanism 574a. The temporary contact at 572a energizes a solenoid 578 whereby to close a starting switch 579, against the resistance of a spring 579a. This occurs immediately following the positioning of the reversing switch 574 and the motor 556 then starts the left-hand movement of slide 555.

The actuator plunger 565 is shiftable by a pivoted lever 585 to its upper position defined by a stop 586, where it is normally retained by a spring 587, or to its lower position defined by a stop 588, respectively by the means of solenoids 589, 590 energized by a switch 591 having contacts 591a, 591b. At the same time that reversing switch 574 is shifted to the left the actuator plunger switch 591 is shifted to effect a contact at 591a whereby to energize solenoid 590 to shift actuator plunger 565 to its lower position, which it continues to occupy during the left-hand slide movement. The actuator plungers 565, 566 are connected together for similar movements by the pivoted levers 592, 593 having ends respectively engaging suitable slots in the different plungers, and having engaged segment portions, as shown.

The closing of starting switch 579 also closes a switch 595, which is connected in series with a pressure switch 596 which is then open, but as soon as the left-hand movement of the slide 555 has proceeded sufficiently to relieve the pressure switch 596 this switch also closes and a holding circuit through solenoid 578 is then completed through the two switches 595, 596, whereby the motor will continue to run, although the initiating pressure switch 572 is opened, as mentioned, shortly thereafter. At the completion of the left-hand movement of slide 555 to the dotted line position, Fig. 19, the work pieces have been shifted to the left, as described, and at this time a pressure switch 600 is closed whereby to energize a solenoid 601 which shifts reverser switch 574 back to the position shown in Fig. 19, thereby reversing the direction of motor 556 to return the slide 555 to the right, to its full line position. The shifting of reverser switch 574 also interrupts the circuit to the solenoid 590 and energizes the solenoid 589 through the switch contact 591b, whereby the actuator plungers 565, 566 are shifted to their upper position and remain there during right-hand movement of slide 555. When slide 555 reaches its right-hand position the circuit through pressure switch 596 is interrupted thereby de-energizing the holding circuit of solenoid 578 of the starting switch 579, which is then returned to initial position by the spring 579a. The complete cycle of the initial loading device, as described, returns all the parts to the position shown in Fig. 19, for the starting of another cycle as determined by the rotation of the timing cam.

Where the transfer mechanism just described is used the operation of the machine is continuous, and it continues to effect balanced work pieces as long as parts are supplied by the conveyor 550 and removed by conveyor 551.

Where the work parts are to be manually positioned and removed control mechanism may be used to automatically stop the machine at the end of the balancing cycle, the machine being then manually started again when the finished work piece has been replaced by a new work piece. For such operation of the machine modified control mechanism may be provided as diagrammatically shown in Fig. 20. A main motor 610 drives the various shafts of the machine, such as shafts 50, 539, Fig. 1, and shaft 115, Fig. 8, etc., through transmission mechanism not shown, effecting suitable timed relationship therebetween. A normally open push button switch 611 operates a motor switch 612 through a switch solenoid 612a operating against the resistance of a spring 612b. The closing of motor switch 612 also closes a holding circuit through a switch 612c, a normally closed push button switch 614 and a normally closed cam controlled switch 615.

The switch 615 is connected for operation from a plunger 616 having an end portion cooperating with a timing cam 617 fixed on the shaft 50. The plunger 616 is normally urged against the cam periphery by a spring 618, being then a trifle to the right of the position shown in Fig. 20, but with switch 615 still closed. When the cam 617 rotates to the position corresponding to the completion of the balancing cycle of the machine, which is the cam position shown in Fig. 20, the plunger drops into a configuration 617a, whereby switch 615 is opened to interrupt the holding circuit through solenoid 612 and open the motor switch 611 to stop the motor.

With the motor stopped, as stated, the finished work piece may be removed and a new work piece placed on the work carrier 32, Fig. 4. Following this the switch 615 is manually closed by an exposed operating knob 620, being pulled to the left in Fig. 20 sufficiently for a spring plunger 621 to engage behind a suitable abutment 622 on the plunger 616 to temporarily retain the plunger 616 in the Fig. 20 position. The push button switch 611 may then be operated to start the motor and the holding circuit operates as before, but after the cam configuration 617a has rotated to a point where the cam periphery will hold the plunger 616 in switch-closed position the spring plunger 621 is withdrawn by operation of the cam on a pivoted lever 623, and the cam then maintains the switch 615 closed until the completion of the machine cycle, as before.

It will be understood that the push button switch 614, Fig. 20, is not necessary to the described operation of the device, being intended for stopping the driving motor 610 to stop the machine at an intermediate point in the balancing cycle, as is sometimes desirable. The machine can then be started again, to complete the cycle, by operation of the push button switch 611. A control of the driving motor by push button switches such as 611, 614 is desirable also for the continuous automatic operation previously described, but in such case the cam controlled switch 615 is unnecessary.

It will be further understood that, as stated, the invention contemplates various embodiments. As illustrative of certain of the contemplated variations, balancing may be effected by removal of metal in various manners by the use of various types of tools, as well as by the specific form of driller device herein illustrated and described, or may be effected by addition instead of removal of balancing material. Also, for the specific form of control pattern device shown herein there may be substituted other suitable means for recording the measurement of the angle and amount of unbalance, either in a device which unitarily records both measurements, as does the illustrated device, or which records the different measurements separately, since the control functions of the device are separately exercised. Moreover, the invention, in some of its aspects, may be embodied in machines where the support movements are manually effected. It is further contemplated that the machine here shown may be provided with unbalance inspection mechanism for acceptance or rejection of the balanced work pieces, similar to the mechanism provided for that purpose in the copending application previously referred to.

What is claimed is:

1. In a machine for reducing unbalance about the intended rotation axis of a work piece, the combination of a work support pivoted for unbalance weighing movement about a horizontal pivot axis while a work piece is deposited on the support, an unbalance determining device including a portion registering a resultant of two successive weighing movements of said support respectively in different relative angular positions of said deposited work piece about its intended rotation axis, an unbalance altering device including a portion adjustable for changing some of the characteristics of the alteration effected thereby, and an operative interconnection for adjustment of said altering device portion in automatic accordance with a characteristic of said resultant registered by said determining device portion.

2. In a machine for reducing unbalance about the intended rotation axis of a work piece, the combination of a work support pivoted for unbalance weighing movement about a horizontal pivot axis while a work piece is deposited on the support, an unbalance determining device including a portion registering a resultant of two successive weighing movements of said support respectively in different relative angular positions of said deposited work piece about its intended rotation axis, an unbalance altering device including work and tool carriers relatively angularly movable about the intended rotation axis of a work piece supported on the work carrier, and transmission and control mechanism for effecting said relative angular movement of the carriers in automatic accordance with a characteristic of said resultant registered on said determining device portion.

3. In a machine for reducing unbalance about the intended rotation axis of a work piece, the combination of a work support pivoted for unbalance weighing movement about a horizontal pivot axis while a work piece is deposited on the support, an unbalance determining device including a portion registering a resultant of two successive weighing movements of said support respectively in different relative angular positions of said deposited work piece about its intended rotation axis, an unbalance altering device including a portion adjustable for changing the amount of the alteration, and an operative interconnection for adjustment of said altering device portion in automatic accordance with a characteristic of said resultant registered by said determining device portion.

4. In a machine for reducing unbalance about the intended rotation axis of a work piece, the combination of a work support pivoted for unbalance weighing movement about a horizontal pivot axis while a work piece is deposited on the support, an unbalance determining device including a portion registering a resultant of two successive weighing movements of said support respectively in different relative angular positions of said deposited work piece about its intended pivot axis, an unbalance altering device including work and tool carriers relatively bodily movable and relatively angularly movable about the intended rotation axis of a work piece supported on the work carrier, and including adjustable stop means limiting a direction of said relative bodily movement, and transmission and control mechanism for effecting said relative angular movement of the carriers and the adjustment of said stop means respectively in accordance with different characteristics of said resultant registered by said determining device portion.

5. In a machine for measuring unbalance about an intended rotation axis of a work piece, the combination of a control pattern device including an angularly movable support and a pattern member shiftably carried thereby, a weighing device including a work support pivoted for unbalance weighing movement about a horizontal axis and including a part movable to different positions respectively corresponding to different weighing movements about said pivot axis set up by a work piece deposited on said support respectively in different relative angular positions about the intended rotation axis of the deposited work piece, transmission and control mechanism for movement of said deposited work piece from one to another of said angular positions and corresponding angular movement of said control pattern device support, and a shifter device operable in each of said angular positions of the deposited work piece for shifting said pattern member in accordance with the position of said weighing device movable part.

6. In a machine for reducing unbalance about an intended rotation axis of a work piece, the combination of a control pattern device including an angularly movable support and a pattern member shiftably carried thereby, an unbalance determining device including a work support pivoted for unbalance weighing movement about a horizontal axis and including a part movable to different positions respectively corresponding to different weighing movements about said pivot axis set up by a work piece deposited on said support respectively in different relative angular positions about the intended rotation axis of the deposited work piece, transmission and control mechanism for movement of said deposited work piece from one to another of said angular positions and corresponding angular movement of said control pattern device support, a shifter device operable in each of said angular positions of the deposited work piece for shifting said pattern member in accordance with the position of said determining device movable part, an unbalance altering device including a portion adjustable for changing some of the characteristics of the alteration effected thereby, and an operative interconnection for adjustment of said altering device adjustable portion in accordance with the position of said pattern member relative to its support.

7. In a machine for reducing unbalance about an intended rotation axis of a work piece, the combination of a control pattern device including an angularly movable support and a pattern member shiftably carried thereby, an unbalance determining device including a work support pivoted for unbalance weighing movement about a horizontal axis and including a part movable to different positions respectively corresponding to different weighing movements about said pivot axis set up by a work piece deposited on said support respectively in different relative angular positions about the intended rotation axis of the deposited work piece, transmission and control mechanism for movement of said deposited work piece from one to another of said angular positions and corresponding angular movement of said control pattern device support, a shifter device operable in each of said angular positions of the deposited work piece for shifting said pattern member in accordance with the position of said determining device movable part, an unbalance altering device including work and tool carriers relatively angularly movable about the intended rotation axis of a work piece supported on said work carrier, and transmission and control mechanism for effecting said relative angular movement of the carriers in accordance with the angular position of said pattern member about the axis of the angular movement of the pattern member support.

8. In a machine for reducing unbalance about an intended rotation axis of a work piece, the combination of a control pattern device including an angularly movable support and a pattern member shiftably carried thereby, an unbalance determining device including a work support pivoted for unbalance weighing movement about a horizontal axis and including a part movable to different positions respectively corresponding to different weighing movements about said pivot axis set up by a work piece deposited on said support respectively in different relative angular positions about the intended rotation axis of the deposited work piece, transmission and control mechanism for movement of said deposited work piece from one to another of said angular positions and corresponding angular movement of said control pattern device support, a shifter device operable in each of said angular positions of the deposited work piece for shifting said pattern member in accordance with the position of said determining device movable part, an unbalance altering device including work and tool carriers relatively bodily movable and relatively angularly movable about the intended axis of rotation of a work piece supported on said work carrier, and including adjustable stop means for limiting a direction of said bodily relative movement, and transmission and control mechanism for effecting both said relative angular movement of the carriers and the adjustment of said stop means in accordance with the position of said pattern member on its support.

9. In a machine for unbalance reduction about an axis of intended rotation of a work piece, the combination of an unbalance determining device including supporting means for pivoting a work piece for successive unbalance weighing movements about a horizontal axis and respectively in different relative angular positions of the pivoted work piece about its intended rotation axis, said device including a portion registering a resultant of a plurality of said weighing movements, an unbalance altering device including a portion adjustable for changing some of the characteristics of the alteration effected thereby, and an operative interconnection for adjustment of said altering device adjustable portion in automatic correspondence with a characteristic of said resultant registered by the determining device portion.

10. In a machine for unbalance reduction about an axis of intended rotation of a work piece, the combination of an unbalance determining device including supporting means for pivoting a work piece for successive unbalance weighing movements about a horizontal axis and respectively in different relative angular positions of the pivoted work piece about its intended rotation axis, said device including a portion registering a resultant of a plurality of said weighing movements, an unbalance altering device including work and tool carriers relatively angularly adjustable about the intended rotation axis of a work piece on said work carrier, and transmission and control mechanism for effecting said relative angular movement of the carriers in accordance with a characteristic of said resultant registered by said determining device portion.

11. In a machine for unbalance reduction about the axis of intended rotation of a work piece, the combination of an unbalance determining device including supporting means for pivoting a work piece for successive unbalance weighing movements about a horizontal axis and respectively in different relative angular positions of the pivoted work piece about its intended rotation axis, said device also including a portion registering a resultant of a plurality of said weighing movements, an unbalance altering device including work and tool carriers relatively bodily movable and relatively angularly adjustable about the intended rotation axis of a work piece supported on the work carrier, and including adjustable stop means limiting a direction of said relative bodily movement, and transmission and control mechanism for effecting said relative angular movement of the carriers and the adjustment of said stop means respectively in automatic correspondence with different characteristics of said resultant registered by the determining device portion.

12. A machine for operating on work pieces having an axis of intended rotation and comprising, in combination, a support pivoted for unbalance weighing movement about a horizontal axis and adapted to support a work piece in different relative angular positions thereof about its intended rotation axis, a position changing device associated with said support and operable for movement of a work piece from one to another of said different relative angular positions, transmission and control mechanism for operation of said position changing device, a registering device associated with said support for registering a combined resultant of the unbalance moments operative about the pivot axis of said support respectively in said different angular positions of the work piece, an unbalance altering device including a portion adjustable for changing some of the characteristics of the alteration effected by the device, and an operative interconnection for adjustment of said altering device adjustable portion in automatic accordance with the value of a characteristic of said resultant registered by the registering device.

13. A machine for operating on work pieces having an axis of intended rotation and comprising, in combination, a support pivoted for unbalance weighing movement about a horizontal axis and adapted to support a work piece in different relative angular positions thereof about its intended rotation axis, a position changing device associated with said support and operable for movement of a work piece from one to another of said different relative angular positions, transmission and control mechanism for operation of said position changing device, a registering device associated with said support for registering a combined resultant of the unbalance moments operative about the pivot axis of said support respectively in said different relative angular positions of the work piece, an unbalance altering device including a work carrier and a tool carrier relatively angularly movable about the axis of a work piece supported on the work carrier, and transmission and control mechanism for effecting said angular movement of the carriers in automatic accordance with the value of a characteristic of said resultant registered by the registering device.

14. A machine for operating on work pieces having an axis of intended rotation and comprising, in combination, a support pivoted for unbalance weighing movement about a horizontal axis and adapted to support a work piece in different relative angular positions thereof about its intended rotation axis, a position changing device associated with said support and operable for movement of a work piece from one to another of said different relative angular positions, transmission and control mechanism for operation of said position changing device, a registering device associated with said support for registering a combined resultant of the unbalance moments operative about the pivot axis of said support respectively in said different relative angular positions of the work piece, an unbalance altering device including a work carrier and a tool carrier relatively bodily movable and adjustable stop means limiting a direction of said bodily movement, and an operative interconnection for adjustment of said adjustable stop in automatic accordance with the value of a characteristic of said resultant registered by the registering device.

15. A machine for operating on work pieces having an axis of intended rotation and comprising, in combination, a support pivoted for unbalance weighing movement about a horizontal axis and adapted to support a work piece in different relative angular positions thereof about its intended rotation axis, a position changing device associated with said support and operable for movement of a work piece from one to another of said different relative angular positions, transmission and control mechanism for operation of said position changing device, a registering device associated with said support for registering a combined resultant of the unbalance moments operative about the pivot axis of said support respectively in said different angular relative positions of the work piece, an unbalance altering device including a work carrier and a tool carrier relatively bodily movable and relatively angularly movable about the intended axis of rotation of a work piece supported on said work carrier, and including adjustable stop means limiting a direction of said relative bodily movement, and transmission and control mechanism for effecting said relative angular movement of the carriers and the adjustment of said stop means respectively in accordance with the value of different characteristics of said resultant registered by said registering device.

16. In a machine for measurement of unbalance of a work piece about an axis of intended rotation thereof, the combination of a support pivoted for unbalance weighing movement about a horizontal axis and adapted to support a work piece in different relative angular positions thereof about its intended rotation axis, a moving device associated with said support for angular movement of the work piece from one to another of said relative angular positions, a device for locating a work piece on said support in a predetermined position of the intended axis of rotation thereof relative to the support pivot axis in either of said angular work positions, and including a portion movable between locating and releasing positions, and transmission and control mechanism for operation of said devices for effecting the releasing position of said locating device portion, effecting operation of the moving device, and effecting the locating position of said locating device portion, and including timing means for effecting said device operations in the order recited.

17. In a machine for measurement of unbalance of a work piece about an axis of intended rotation thereof, the combination of a support pivoted for unbalance weighing movement about a horizontal axis and adapted to support a work piece in different relative angular positions thereof about its intended rotation axis, a transfer device including a work piece carrier bodily movable relative to said support and adapted to receive a work piece in a first position of the carrier, a device for movement of a work piece from one to the other of said angular positions, and transmission and control mechanism for operation of said devices for effecting carrier movement from said first position to a second position depositing the work piece on said support in one of said angular positions thereof, and carrier movement from said second position to a third position removing the work piece from said support, and operation of said angular movement device for effecting the other of said angular positions of the work piece and carrier movement from said third position to a fourth position depositing the work piece on said support in said other angular position thereof, and carrier movement from said fourth position to a fifth position removing said work piece from said support, said transmission and control mechanism including timing means operable for effecting said operation of said devices in the order recited.

18. In a machine for alteration of balance of a work piece about an axis of intended rotation thereof, the combination of a support pivoted for unbalance weighing movement about a horizontal pivot axis and adapted to support a work piece in different relative angular positions thereof about its intended rotation axis, a transfer device including a work piece carrier bodily movable relative to said support and adapted to receive a work piece in a first position of the carrier, a device for movement of a work piece from one to the other of said angular positions, transmission and control mechanism for operation of said devices for effecting carrier movement from said first position to a second position depositing the work piece on said support in one of said angular positions thereof, and carrier movement from said second position to a third position removing the work piece from said support, and operation of said angular movement device for effecting the other of said angular positions of the work piece, and carrier movement from said third position to a fourth position depositing the work piece on said support in said other angular position thereof, and carrier movement from said fourth position to a fifth position removing said work piece from said support, said transmission and control mechanism including timing means operable for effecting said operation of said devices in the order recited, a registering device associated with said pivoted support for registering a combined resultant of the different unbalance moments operative about the support pivot axis respectively in said different angular positions of the work piece deposited on the support, an unbalance alteration device including a portion adjustable for changing some of the characteristics of the alteration, and an operative interconnection for adjustment of said altering device adjustable portion in accordance with the value of a characteristic of said resultant registered by the registering device.

19. In a machine for alteration of balance of a work piece about an axis of intended rotation thereof, the combination of a support pivoted for unbalance weighing movement about a horizontal pivot axis and adapted to support a work piece in different relative angular positions thereof about its intended rotation axis, a transfer device including a work piece carrier bodily movable relative to said support and adapted to receive a work piece in a first position of the carrier, a device for movement of a work piece from one to the other of said angular positions thereof, transmission and control mechanism for operation of said devices for effecting carrier movement from said first position to a second position depositing the work piece on said support in one of said angular positions thereof, and carrier movement from said second position to a third position removing the work piece from said support, and operation of said angular movement device for effecting the other of said angular positions of the work piece, and carrier movement from said third position to a fourth position depositing the work piece on said support in said other angular position thereof, and carrier movement from said fourth position to a fifth position removing said work piece from said support, said transmission and control mechanism including timing means operable for effecting said operations of said devices in the order recited, a registering device associated with said pivoted support for registering a combined resultant of the different unbalance moments operative about the support pivot axis respectively in said different angular positions of the work piece deposited on the support, an unbalance altering device including a portion adjustable for changing the amount of the alteration, and an operative interconnection for adjusting said altering device adjustable portion in accordance with the value of a characteristic of said resultant registered by the registering device.

20. In a machine for alteration of balance of a work piece about an axis of intended rotation thereof, the combination of a support pivoted for unbalance weighing movement about a horizontal axis and adapted to support a work piece in different angular positions thereof about its intended rotation axis, a transfer device including a work piece carrier bodily movable relative to said support and adapted to receive a work piece in a first position of the carrier, a device for movement of a work piece from one to the other of said angular positions thereof, transmission and control mechanism for operation of said devices for effecting carrier movement from said first position to a second position depositing the work piece on said support in one of said angular positions thereof, and carrier movement from said second position to a third position removing the work piece from said support, and operation of said angular movement device for effecting the other of said angular positions of the work piece, and carrier movement from said third position to a fourth position depositing the work piece on said support in said other angular position thereof, and carrier movement from said fourth position to a fifth position removing said work piece from said support, said transmission and control mechanism including timing means operable for effecting said operations in the order recited, a registering device associated with said pivoted support for registering a combined resultant of the different unbalance moments operative about the support pivot axis respectively in said different angular positions of the work piece deposited on the support, an unbalance altering device adjustable for effecting the alteration at various angular positions about the intended rotation axis of a work piece, and an operative interconnection for adjusting said altering device for effecting said alteration at an angular position controlled in accordance with the value of a characteristic of said resultant registered by said registering device.

21. In a machine for measurement of unbalance about the intended axis of rotation of a work piece, the combination of a work support pivoted for unbalance weighing movement about a horizontal axis, a transfer device associated with said support for movement of a work piece relative thereto between different positions respectively deposited on said support and at a level relatively above the support, a device for predetermined angular movement of a work piece about said intended rotation axis, and transmission and control mechanism for operation of said devices for effecting transfer of a work piece from said position deposited on the support to said position at a level above the support, for effecting said predetermined angular movement of the work piece, and for effecting transfer of the work piece from said level above the support to said position deposited on the support, said transmission and control mechanism including timing means for effecting said operations in the order recited.

22. In a machine for measurement of unbalance about the intended axis of rotation of a work piece, the combination of a work support pivoted for unbalance weighing movement about a horizontal axis, a transfer device associated with said support for movement of a work piece relative thereto between different positions respectively deposited on said support and at a level relatively above the support, a locating device associated with said support and alternatively operable for establishing a predetermined moment weighing position of said rotation axis of a work piece relative to the support pivot axis or releasing the work piece, a device for predetermined angular movement of a work piece about said intended rotation axis, and transmission and control mechanism for operation of said locating device to establish said predetermined position of a work piece deposited on the support relative to the support pivot axis, for operation of said locating device to effect said release of the work piece, for operation of said transfer device to effect transfer of the work piece to said level above the support, for operation of said angular movement device to effect said predetermined angular movement of the work piece, for operation of said transfer device to effect transfer of the work piece to said position deposited on the support, and for operation of said locating device to establish said predetermined position of the work piece, said transmission and control mechanism including timing means effecting said operation of the devices in the order recited.

23. In a machine for measurement of unbalance about the intended axis of rotation of a work piece, the combination of a work support pivoted for unbalance weighing movement about a horizontal axis, a transfer device associated with said support for movement of a work piece relative thereto between different positions respectively deposited on said support and at a level relatively above the support, a device associated with said support for predetermined angular movement of a work piece about said intended rotation axis, transmission and control mechanism for operation of said devices for transfer of a work piece from said position deposited on the support to said position at a level above the support, for effecting said predetermined angular movement of the work piece, and for transfer of the work piece from said level above the support to said position deposited on the support, said transmission and control mechanism including timing means for effecting said operations of the devices in the order recited, and a determining device associated with said support and including a portion registering the angular position of an unbalance in the work piece as a resultant of value of the different weighing movements of said support respectively in the different angular positions of said work piece deposited on the support.

24. In a machine for measurement of unbalance about the intended axis of rotation of a work piece, the combination of a work support pivoted for unbalance weighing movement about a horizontal pivot axis, a transfer device associated with said support for movement of a work piece relative thereto between different positions respectively deposited on said support and at a level relatively above the support, a device associated with said support for predetermined angular movement of a work piece about said intended rotation axis, transmission and control mechanism for operation of said devices for transfer of a work piece from said position deposited on the support to said position at a level above the support, for effecting said predetermined angular movement of the work piece, and for transfer of the work piece from said level above the support to said position deposited on the support, said transmission and control mechanism including timing means for effecting said operations of the devices in the order recited, and a determining device associated with said support including a portion registering the amount of the moment of an unbalance in the work piece as a resultant of the value of the different weighing movements of said support respectively in the different angular positions of the work piece deposited on the support.

25. In a machine for unbalance reduction about the axis of intended rotation of a work piece, the combination of an unbalance determining device including work supporting means for pivoting the work piece with the pivot axis horizontal in each of successive positions respectively in different angular positions of the work piece about the intended rotation axis, said determining device also including a portion registering a combined resultant of the different unbalance moments about said pivot axis respectively in different of said successive work piece positions, an unbalance altering device including work and tool carriers relatively bodily movable and relatively angularly adjustable about the intended rotation axis of a work piece supported on the work carrier, and including adjustable stop means limiting a direction of said relative bodily movement, and transmission and control mechanism for effecting said relative angular movement of the carriers and the adjustment of said stop means respectively in accordance with the value of different characteristics of said resultant registered by the determining device portion.

26. In a machine for reducing unbalance about the intended axis of rotation of a work piece, the combination of a work support pivoted for unbalance weighing movement about a horizontal pivot axis, a transfer device associated with said support for movement of a work piece relative thereto between different positions respectively deposited on said support and at a level relatively above the support, a device associated with said support for predetermined angular movement of a work piece about said intended rotation axis, transmission and control mechanism for operation of said devices for transfer of a work piece from said position deposited on the support to said position at a level above the support, for effecting said predetermined angular movement of the work piece, and for transfer of the work piece from said level above the support to said position deposited on the support, said transmission and control mechanism including timing means effecting said operations in the order recited, a recording mechanism associated with said devices and including a portion registering a resultant of different unbalance weighing movements of said support respectively in the different angular positions of the work piece deposited thereon, an unbalance altering device including relatively angularly movable tool and work carriers, and transmission and control means for effecting said relative angular movement of said carriers in accordance with the value of a characteristic of said resultant registered by said recording mechanism.

27. In a machine for reducing unbalance about the intended axis of rotation of a work piece, the combination of a work support pivoted for unbalance weighing movement about a horizontal pivot axis, a transfer device associated with said support for movement of a work piece relative thereto between different positions respectively deposited on said support and at a level relatively above the support, a device associated with said support for predetermined angular movement of a work piece about said intended rotation axis, transmission and control mechanism for operation of said devices for transfer of a work piece from said position deposited on the support to said position at a level above the support, for effecting said predetermined angular movement of the work piece, and for transfer of the work piece from said level above the support to said position deposited on the support, said transmission and control mechanism including timing means effecting said operations in the order recited, a recording mechanism associated with said devices including a portion registering a resultant of different unbalance weighing movements of said support respectively in the different angular positions of the work piece deposited thereon, an unbalance altering device including a part adjustable for changing the amount of alteration effected thereby, and transmission and control mechanism for adjustment of said adjustable part in accordance with the value of a characteristic of said resultant registered by said recording mechanism.

28. In a machine for unbalance reduction about the axis of intended rotation of a work piece, the combination of an unbalance determining device including work supporting means for pivoting a work piece for a plurality of unbalance weighing movements about a horizontal axis and respectively in different relative angular positions of the work piece about its intended rotation axis, said determining device also including adjustable registering mechanism and means for a plurality of adjustments thereof respectively in accordance with different of said weighing movements, said adjustments effecting registration of a characteristic of the angle of the unbalance of the work piece about its intended rotation axis and of a characteristic of the moment of the unbalance, an unbalance altering device including work and tool carriers relatively angularly movable about the intended rotation axis of a work piece supported on the work carrier, and including means adjustable for determining the amount of the alteration, transmission and control means for effecting said angular carrier movement in accordance with said characteristic of the unbalance angle registered by said registering mechanism, and an operative interconnection for effecting adjustment of said amount determining means in accordance with said characteristic of the unbalance moment registered by said registering mechanism.

29. In a machine for reducing unbalance about the intended axis of rotation of a work piece, the combination of a work support pivoted for unbalance weighing movement about a horizontal axis and adapted to receive a work piece with the intended rotation axis substantially vertical, a work carrier vertically movable relative to said support and adapted to receive a work piece at a level relatively above said support, one direction of said relative movement being adapted to deposit the received work piece on said support with the intended rotation axis substantially vertical and approximately in a predetermined lateral unbalance weighing position relative to said pivot axis, said carrier being rotatable relative to said support about the intended rotation axis of said deposited work piece, and transmission and control mechanism for said vertical and rotatable movements of said carrier including means timing the relationship therebetween.

30. In a machine for reducing unbalance about the intended axis of rotation of a work piece, the combination of a work support pivoted for unbalance weighing movement about a horizontal axis and adapted to receive a work piece with the intended rotation axis substantially vertical, a work carrier vertically movable relative to said support and adapted to receive a work piece at a level relatively about said support, one direction of said relative movement being adapted to deposit the received work piece on said support with the intended rotation axis substantially vertical and approximately in a predetermined lateral unbalance weighing position relative to said pivot axis, said carrier being rotatable relative to said support about the intended rotation axis of said deposited work piece, and transmission mechanism for said rotatable carrier movement including a differential device for individual application of different rotational movements to the carrier.

31. In a machine for reducing unbalance about the intended axis of rotation of a work piece, the combination of a work support pivoted for unbalance weighing movement about a horizontal axis and adapted to receive a work piece with the intended rotation axis substantially vertical, a work carrier vertically movable relative to said support and adapted to receive a work piece at a level relatively about said support, one direction of said relative movement being adapted to deposit the received work piece on said support with the intended rotation axis substantially vertical and approximately in a predetermined lateral unbalance weighing position relative to said pivot axis, said carrier being rotatable relative to said support about the intended rotation axis of said deposited work piece, and transmission mechanism for said rotatable carrier movement including a plurality of power operable trains respectively for different carrier rotary movements and a differential device simultaneously connecting each of said trains with said carrier.

WILLIAM BARTON EDDISON.